US010378889B2

(12) United States Patent
Grau

(10) Patent No.: US 10,378,889 B2
(45) Date of Patent: Aug. 13, 2019

(54) MEASUREMENT SYSTEM HAVING A COOPERATIVE ROBOT AND THREE-DIMENSIONAL IMAGER

(71) Applicant: FARO Technologies, Inc., Lake Mary, FL (US)

(72) Inventor: Markus Grau, Marbach (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/001,374

(22) Filed: Jun. 6, 2018

(65) Prior Publication Data
US 2019/0063907 A1 Feb. 28, 2019

Related U.S. Application Data

(60) Provisional application No. 62/548,577, filed on Aug. 22, 2017.

(51) Int. Cl.
*G01B 11/25* (2006.01)
*G01V 8/20* (2006.01)
*G06T 7/55* (2017.01)
*G06T 7/521* (2017.01)
*B25J 9/16* (2006.01)
*H04N 5/247* (2006.01)

(52) U.S. Cl.
CPC ........ *G01B 11/2545* (2013.01); *B25J 9/1697* (2013.01); *G01B 11/2518* (2013.01); *G01V 8/20* (2013.01); *G06T 7/521* (2017.01); *G06T 7/55* (2017.01); *H04N 5/247* (2013.01); *G06T 2207/10028* (2013.01); *Y10S 901/47* (2013.01)

(58) Field of Classification Search
CPC ............... B25J 9/1697; G01B 11/2518; G01B 11/2545; G01V 8/20; G06T 2207/10028; G06T 7/521; G06T 7/55; H04N 5/247; Y10S 901/47
USPC .................................................. 356/600–640
See application file for complete search history.

(56) References Cited

U.S. PATENT DOCUMENTS

| | | |
|---|---|---|
| 5,670,787 A | 9/1997 | Pryor et al. |
| 5,734,172 A | 3/1998 | Pryor et al. |
| 5,880,459 A | 3/1999 | Pryor et al. |
| 5,940,302 A | 8/1999 | Pryor |
| 6,138,055 A | 10/2000 | Pryor |
| 6,211,506 B1 | 4/2001 | Pryor et al. |
| 6,466,305 B1 | 10/2002 | McBain |
| 6,617,601 B1 | 9/2003 | Wiklund |
| 6,618,155 B2 | 9/2003 | Metcalfe et al. |
| 6,825,936 B2 | 11/2004 | Metcalfe et al. |

(Continued)

*Primary Examiner* — Tri T Ton
(74) *Attorney, Agent, or Firm* — Cantor Colburn LLP

(57) ABSTRACT

A measurement system and a method of measuring an object is provided. The system includes a measurement platform having a planar surface. At least two optical sensors are coupled to the measurement platform that emit light in a plane and determines a distance to an object based on a reflection of the light. A linear rail is coupled to the measurement platform. A cooperative robot is coupled to move along the linear rail. A 3D measuring system is coupled to the end of the robot. A controller coupled to the at least two optical sensors, the robot, and the 3D measuring system, the controller changing the speed of the robot and the 3D measuring system to less than a threshold in response to a distance measured by at least one of the at least two optical sensors to a human operator being less than a first distance threshold.

20 Claims, 23 Drawing Sheets

(56) References Cited

U.S. PATENT DOCUMENTS

| | | |
|---|---|---|
| 7,525,114 B2 | 4/2009 | Metcalfe et al. |
| 2002/0023478 A1 | 2/2002 | Pryor |
| 2011/0298916 A1 | 12/2011 | Arden |
| 2016/0171712 A1 | 6/2016 | Arden |

ABSTRACT# MEASUREMENT SYSTEM HAVING A COOPERATIVE ROBOT AND THREE-DIMENSIONAL IMAGER

CROSS REFERENCE TO RELATED APPLICATIONS

This application claims the benefit of U.S. Provisional Application Ser. No. 62/548,577, filed Aug. 22, 2017, the entire disclosure of which is incorporated herein by reference.

BACKGROUND

The subject matter disclosed herein relates in general to a human collaborative robot having a triangulation-type, three-dimensional (3D) imager device, also known as a triangulation scanner.

A 3D imager uses a triangulation method to measure the 3D coordinates of points on an object. The 3D imager usually includes a projector that projects onto a surface of the object either a pattern of light in a line or a pattern of light covering an area. A camera is coupled to the projector in a fixed relationship, for example, by attaching a camera and the projector to a common frame. The light emitted from the projector is reflected off of the object surface and detected by the camera. Since the camera and projector are arranged in a fixed relationship, the distance to the object may be determined using trigonometric principles. Compared to coordinate measurement devices that use tactile probes, triangulation systems provide advantages in quickly acquiring coordinate data over a large area. As used herein, the resulting collection of 3D coordinate values or data points of the object being measured by the triangulation system is referred to as point cloud data or simply a point cloud.

Robotic devices have been widely used in manufacturing and other environments to reduce costs and improve quality. Robotic devices are hard/rigid bodies that may move in a rapid and unpredictable manner. To avoid unintended impact with human operators, a typical manufacturing cell includes a lock-out procedure whereby the robot device is disabled when human operators need to enter the area. By locking out the robotic device it is ensured that the risk of contact by a moving robot is eliminated.

One type of robotic device has been developed, referred to as a human-centric or a collaborative robot, which allows the robot and the human operator to work in close proximity to each other while minimizing the risk of impact to the human operator. These collaborative robots have been proposed and used in a variety of applications, including medical facilities, libraries and manufacturing assembly operations. Collaborative robots include sensors that allow them to monitor their surrounding area including the presence of humans. The robot's controller is programmed to receive these sensor inputs and predict the risk of impact with nearby humans. When a potential impact on a human is detected, the robot takes mitigating actions (e.g. slowing down or changing direction) to avoid contact. In manufacturing environments, these human-centric robots have found use in light assembly and small part manufacturing.

Standards, such as ISO/TS 15066 (2016) and IS 13849-1:2015 for example, have been propagated to define desired performance levels and architecture of sensing systems used with human-centric robots. These standards define operations of the systems to reduce contact risk between an operators and the robotic system. Sensing systems fall under a performance level "d" and category 3 of these standards. At this level of performance, the sensing system needs to have reliability for one type of failure as occurring once every 100-1000 years.

Accordingly, while existing triangulation-based 3D imager devices and collaborative robots are suitable for their intended purpose the need for improvement remains, particularly in providing a system for measuring objects using an imager device that cooperates with a collaborative robot.

BRIEF DESCRIPTION

According to an embodiment of the present invention, a measurement system is provided. The system includes a measurement platform having a planar surface. At least two optical sensors are coupled to the measurement platform, the optical sensors each having a light source, an optical sensor, and a processor that causes light from the light source to be emitted in a plane and determines a distance to an object based on a reflection of the light, the at least two optical sensors being arranged to detect a human operator in a 360 degree area about the measurement platform. A linear rail is coupled to the measurement platform. A cooperative robot is coupled to move along the linear rail. A three-dimensional (3D) measuring system is coupled to the end of the cooperative robot, the 3D measuring system comprising: an imager device having a projector, a first camera and a second camera arranged in a predetermined geometric relationship, the first camera and second camera each having a photosensitive array, the projector projecting a pattern of light that includes at least one element; one or more first processors operably coupled to the display, the projector, the first camera and the second camera, wherein the one or more first processors are responsive to executable computer instructions for determining a distance to the at least one element; and a controller operably coupled to the at least two optical sensors, the cooperative robot, and the 3D measuring system, the controller having one or more second processors that are responsive to executable instructions for changing the speed of the robot and the 3D measuring system to be less than a threshold in response to a distance measured by at least one of the at least two optical sensors to a human operator being less than a first distance threshold.

According to an embodiment of the present invention, a method of measuring an object is provided. The method includes placing an object on a measurement platform. A cooperative robot is moved at a first speed along a rail coupled to the measurement platform. The object is scanned with a three-dimensional (3D) measuring system coupled to an end of the cooperative robot, the 3D measuring system including an imager device having a projector, a first camera and a second camera arranged in a predetermined geometric relationship, the first camera and second camera each having a photosensitive array, the projector projecting a pattern of light that includes at least one element. A plane is scanned about the measurement platform with at least one optical sensor. A human operator is detected, with the at least one optical sensor, at a first distance. The movement of the robot is changed to a second speed when the first distance is less than a first distance threshold, the second speed being less than the first speed.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

Figure 1:
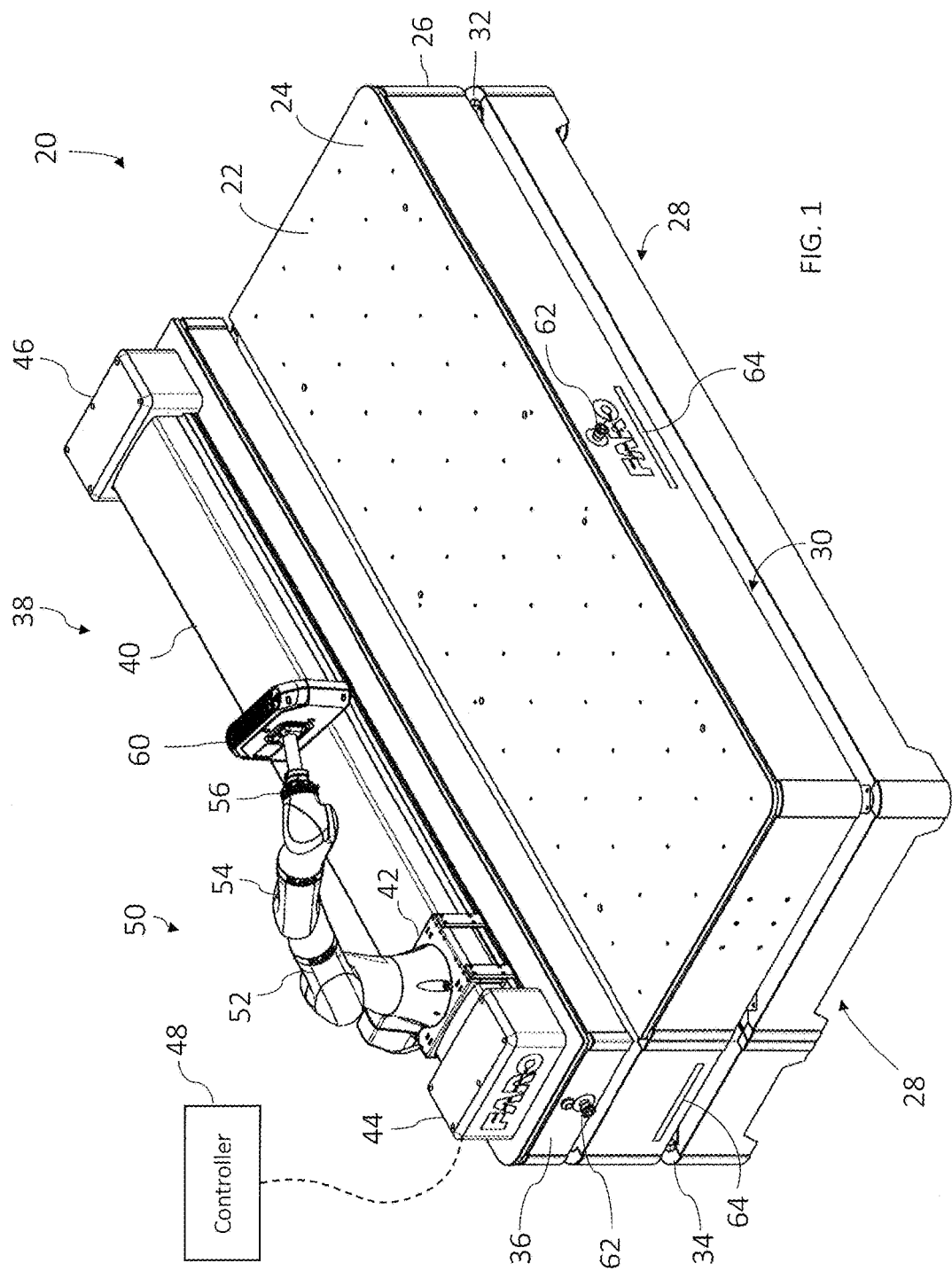
FIGS. 1-5 are views of measurement system according to an embodiment.
Figure 2:
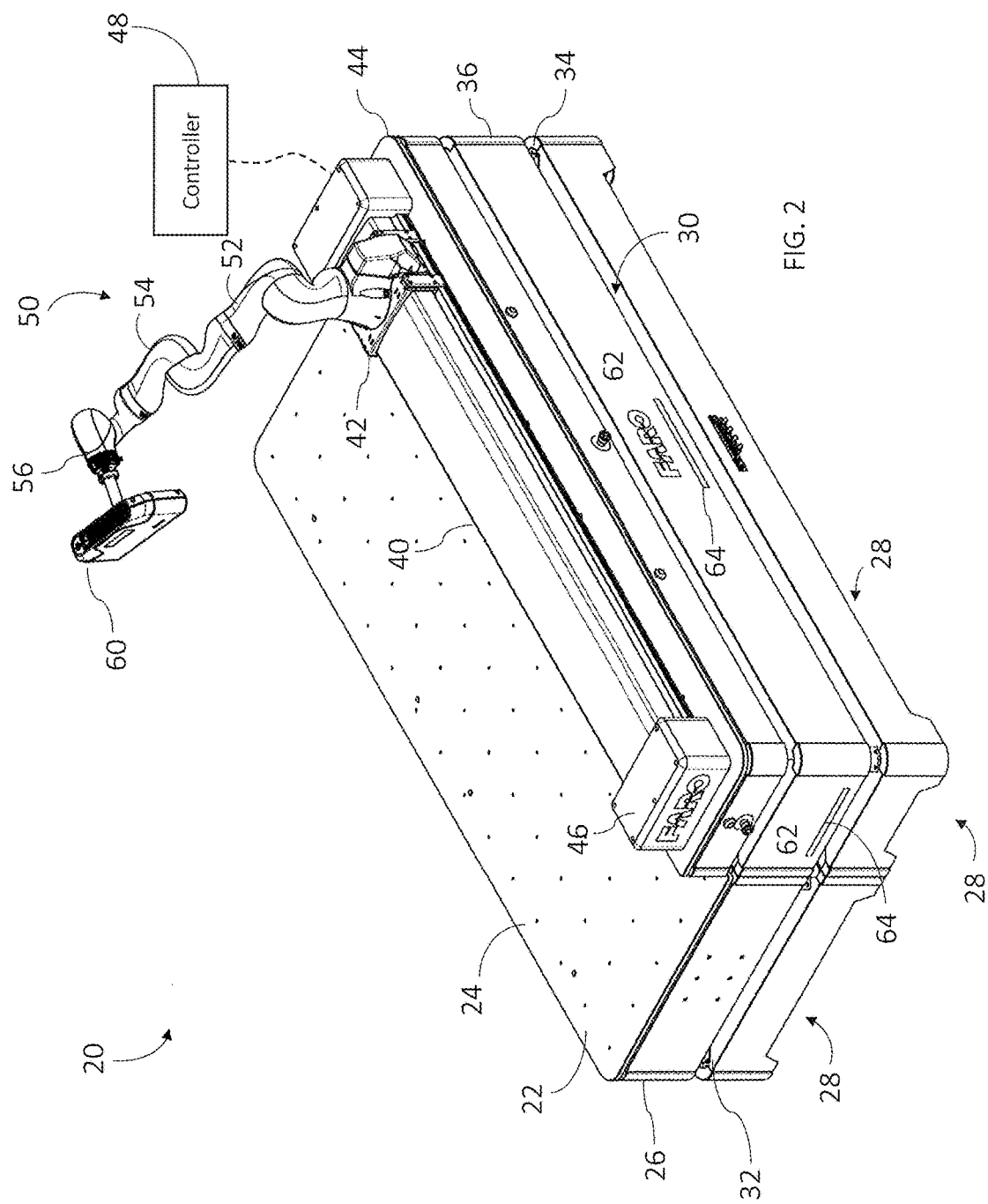
Figure 3:
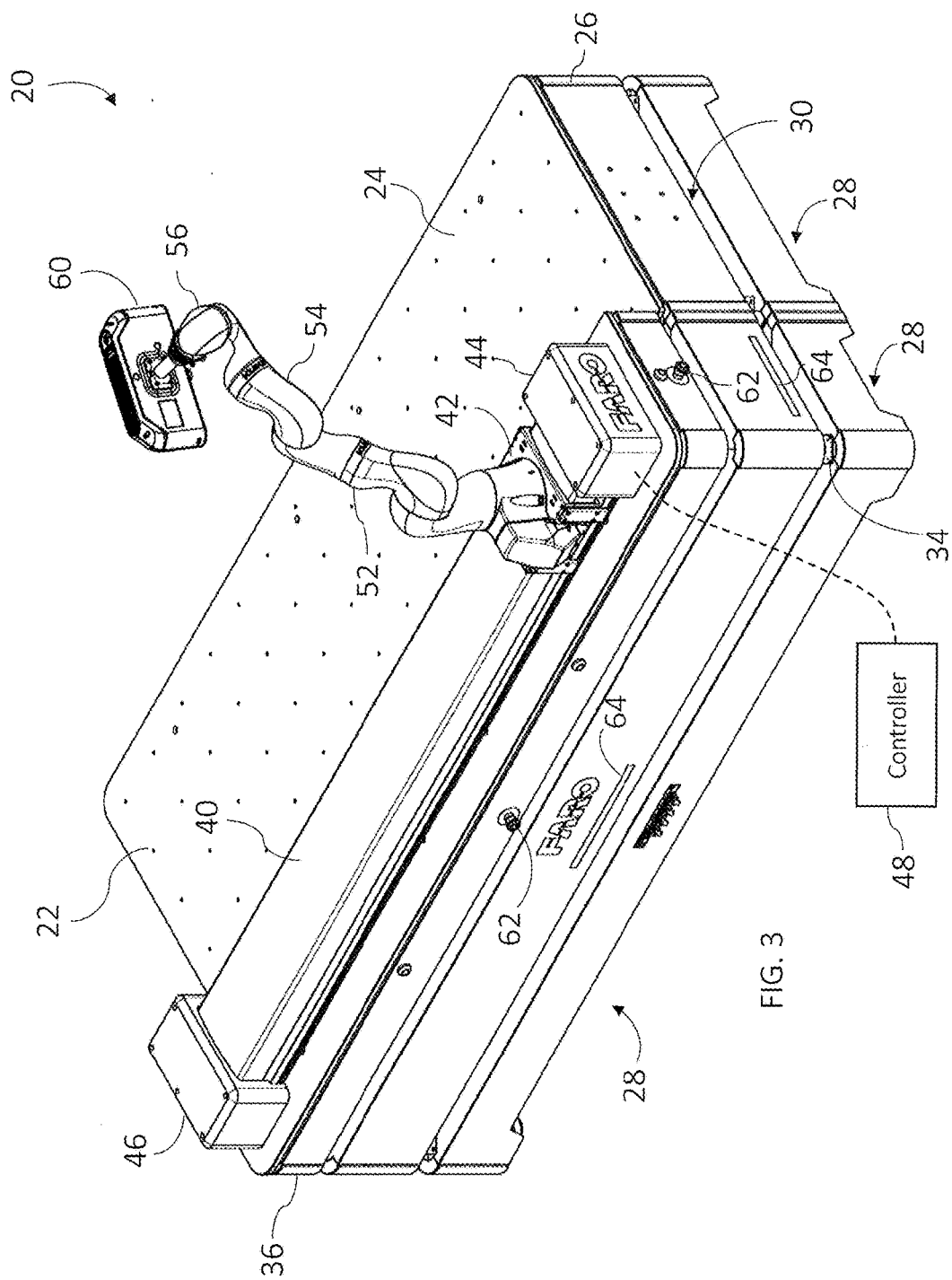
Figure 4:
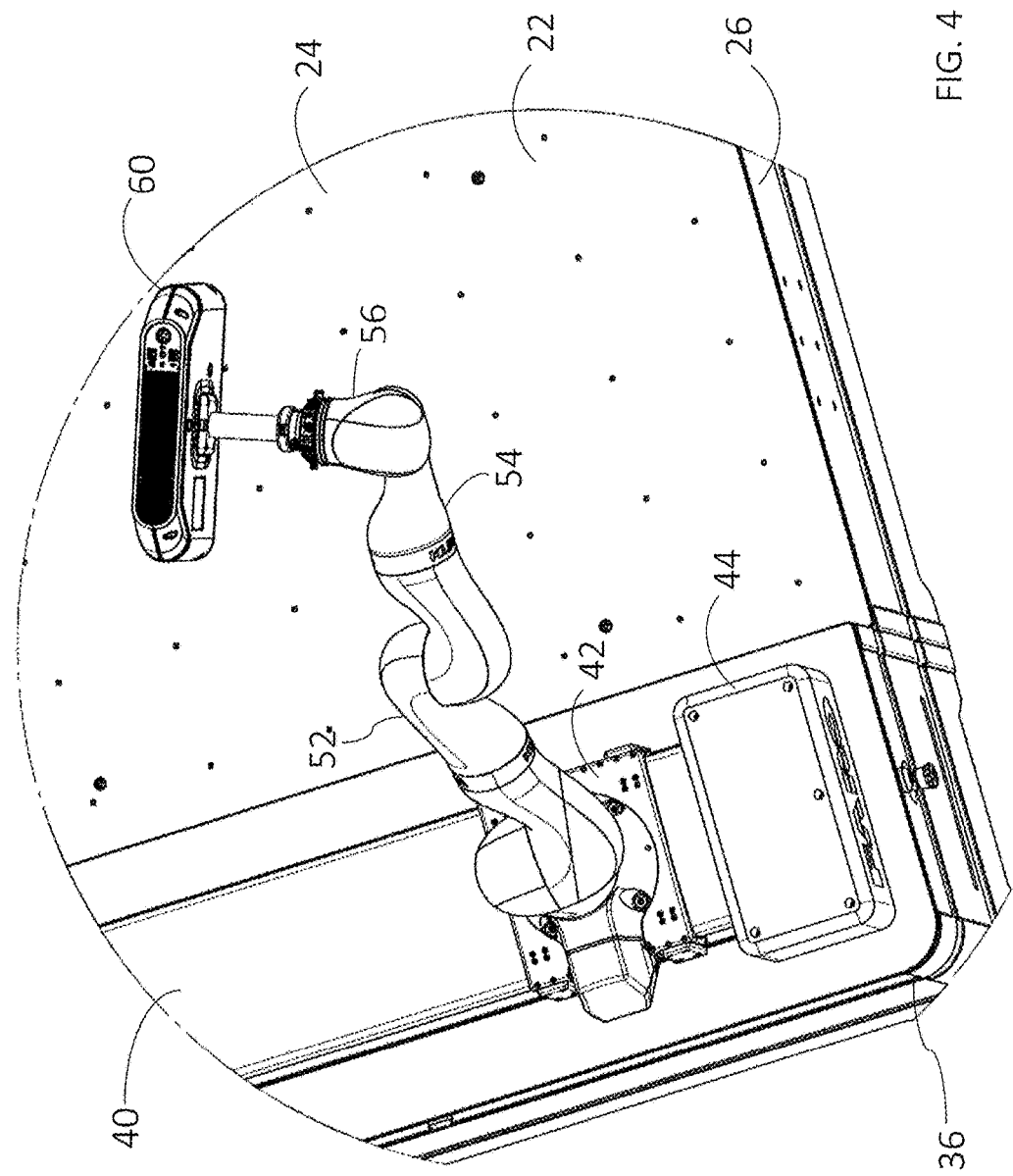
Figure 5:
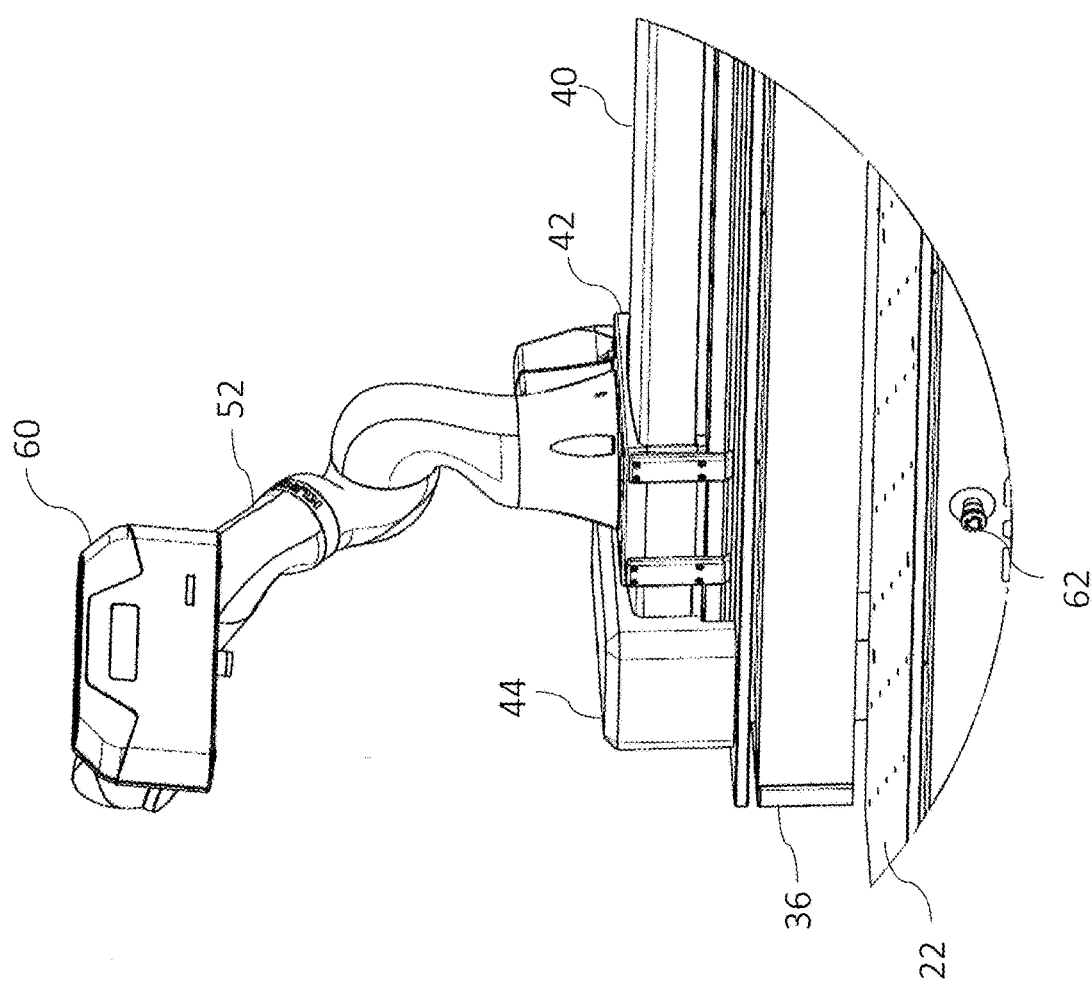

The detailed description explains embodiments of the invention, together with advantages and features, by way of example with reference to the drawings.

DETAILED DESCRIPTION

Embodiments disclosed herein provide advantages in allowing automated measurement or inspection of a part using a collaborative robot with a three-dimensional (3D) measurement device. Further embodiments provide for a measurement system having a platform for holding the object to be inspected, a robot that complies with compliant robot standards, and a 3D measurement device coupled to the robot where the 3D measurement device does not comply with compliant robot standards.

Referring now to FIGS. 1-5, a measurement system 20 is shown that includes a platform 22. The platform 22 is a generally planar surface that is thermally stable and suitable for holding workpieces during an inspection process. The platform 22 may include features 24, such as holes or threaded holes for example, that may be used with auxiliary devices, such as hold downs for example, that secure the workpiece to the platform 22. The platform 22 is elevated off of the floor by a frame member 26. The frame member 26 may include openings 28 to allow an apparatus, such as a forklift for example, to move the measurement system 20. In an embodiment, the frame member 26 may include a recess or slot 30. As will be discussed in more detail herein, in an embodiment, a two-dimensional (2D) optical sensor 32, 34 may be disposed at some or all of the corners of the slot 30.

In the illustrated embodiment, the measurement system 20 includes a raised portion 36 that extends along one longitudinal side of the platform 22. Mounted to the top of the raised portion 36 is a rail assembly 38. The rail assembly 38 includes a slide 40 and a carriage 42. The carriage 42 may be mounted to the rail 40 via bearings (not shown) that allow the carriage 42 to slide along the length of the rail 40. In an embodiment, the carriage 42 may be moved along the slide 40 using motors and belts (not shown) as is known in the art. Disposed at opposing ends of the slide 40 are stop members 44, 46. As will be discussed in more detail herein, the member 44 includes a controller 48.

In the illustrated embodiment, an articulated robotic arm 50 is coupled to the carriage 42. The robotic arm 50 includes a plurality of arm segments 52, 54, 56 that are each rotatable about at least one axis at one end. In some cases, an arm segment may be able to rotate about multiple axis (e.g. a hinge axis and a swivel axis). This allows the robotic arm 50 to articulate to place an end effector mounted to the end of segment 56 in a desired position and orientation with at least six-degrees of freedom. In the exemplary embodiment, an image scanner 60 is mounted to the end of the robotic arm 50. The robotic arm 50 and image scanner 60 are electrically coupled to the controller 48 via the member 44, such as via cabling (not shown) arranged internal to the slide 40 for example. In another embodiment, the cabling may be arranged external to the slide 40, such as with a drag chain (not shown) that extends between a base of the robotic arm 50 and the member 44.

In the exemplary embodiment, the robotic arm 50 is a human cooperative robot, sometimes referred to as a human-centric robot. As used herein, a cooperative robot 50 is a robotic device that is configured to operate autonomously or semi-autonomously in close proximity to a human operator. As used herein, the phrase "close proximity" means that the cooperative robot and the operator are positioned such that portions of the cooperative robot 50 may move within areas that overlap with the human operator during operations. As discussed herein, the controller 48 is configured to alter the speed or movement of the cooperative robot 50 to either avoid contact or reduce the impact on the human operator in the event of contact. In an embodiment, the cooperative robot is configured to have a velocity at the point of contact of less than or equal to 255 millimeters/second, a maximum dynamic power of less than or equal to 80 Watts, or a maximum static force of less than or equal to 150 Newtons. The sensors 32, 34 transmit a position signal that allows the determination of the position of the human operator. In one embodiment, the cooperative robot 50 may incorporate the characteristics for inherent safety described in the journal article "A New Actuation Approach for Human-centric Robot Design" by Zinn et al. (Int. J of Robotics Research, Vol. 23, No. 4-5, April-May 2004, pp. 379-398), the content of which is incorporated herein by reference. In another embodiment, the human-centric robot may include the characteristics described in journal article "Safety Evaluation of Physical Human-Robot Interaction via Crash Testing" by Haddadin et al. (Pro. of Robotics: Science and Systems III, June 2007), the content of which is incorporated herein by reference. In another embodiment, the human-centric robot may comply with ISO Standard ISO/DTS 15066, ISO/TR 13482:2014 or ISO 10218 for example, the contents of which are incorporated by reference herein.

In an embodiment, the controller 48 is arranged within the stop member 44. In an embodiment, the system 20 operation is controlled by controller 48. Controller 48 is a suitable electronic device capable of accepting data and instructions, executing the instructions to process the data, presenting the results, and initiating and executing control methods. Controller 48 may accept instructions through user interface, or through other means such as but not limited to electronic data card, voice activation means, manually-operable selection and control means, radiated wavelength and electronic or electrical transfer. Therefore, controller 48 can be a microprocessor, microcomputer, an ASIC (application specific integrated circuit), a reduced instruction set computer, a digital computer, a supercomputer, a solid-state computer, a single-board computer, a computer network, a desktop computer, a laptop computer, or a hybrid of any of the foregoing.

Controller 48 is capable of converting the analog voltage or current level provided by sensors in the robotic arm 50, slide 40, carriage 42, or 3D imager into a digital signal indicative of the position of the robotic arm 50 or the 3D imager 60. Alternatively, sensors in the robotic arm 50, slide 40, carriage 42, or 3D imager 60 may be configured to provide a digital signal to controller 48, or an analog-to-digital (A/D) converter (not shown) maybe coupled between sensors and controller 48 to convert the analog signal provided by the sensors into a digital signal for processing by controller 48. Controller 48 uses the digital signals act as input to various processes for controlling the system 20.

As discussed herein controller 48 is operably coupled with one or more components of system 20 such as the robotic arm 50 and the 3D imager 60 by data transmission media. Data transmission media may include, but is not limited to, twisted pair wiring, coaxial cable, and fiber optic cable. Data transmission media may also include, but is not limited to, wireless, radio and infrared signal transmission systems.

In general, controller 48 accepts data from sensors and is given certain instructions for the purpose of comparing the data from sensors to predetermined operational parameters. Controller 48 provides operating signals to the robotic arm 50, the 3D imager 60, and the carriage motors. Controller 48 also accepts data from the 3D imager 60, such as 3D coordinate data for example. The controller 48 compares the operational parameters to predetermined variances (e.g. position of the 3D imager 60 relative to an inspection plan) and if the predetermined variance is exceeded, generates a signal that may be used to move the carriage 42, robotic arm 60, or indicate an alarm to an operator on a connected computer network. Additionally, the signal may initiate other control methods that adapt the operation of the system 20 such as changing the speed of the robotic arm 50 and 3D imager 60. For example, as will be discussed in more detail herein, if sensors 32, 34 detect the presence of a person, the controller 48 may determine whether the person is within a predetermined area or zone about the system 20 based on parameters such as distance from the person to a side of system 20, the direction of movement of the person and the speed of the person. In response to determining the person is within the predetermined zone, the controller 48 may reduce the operating speed of the robotic arm 50 or 3D imager 60 to be less than a predetermined speed, such as 255 mm/second for example.

In addition to being coupled to one or more components within system 20, the controller 48 may also be coupled to external computer networks such as a local area network (LAN) and the Internet. LAN interconnects one or more remote computers 50, which are configured to communicate with controller 48 using a well-known computer communications protocol such as TCP/IP (Transmission Control Protocol/Internet(^) Protocol), RS-232, ModBus, and the like. Additional systems 20 may also be connected to LAN with the controllers 48 in each of these systems 20 being configured to send and receive data to and from remote computers and other systems 20. LAN is connected to the Internet. This connection allows controller 48 to communicate with one or more remote computers connected to the Internet.

In an embodiment, the controller 48 includes a processor coupled to a random access memory (RAM) device, a non-volatile memory (NVM) device, a read-only memory (ROM) device, one or more input/output (I/O) controllers, and a LAN interface device via a data communications bus.

Figure 15:
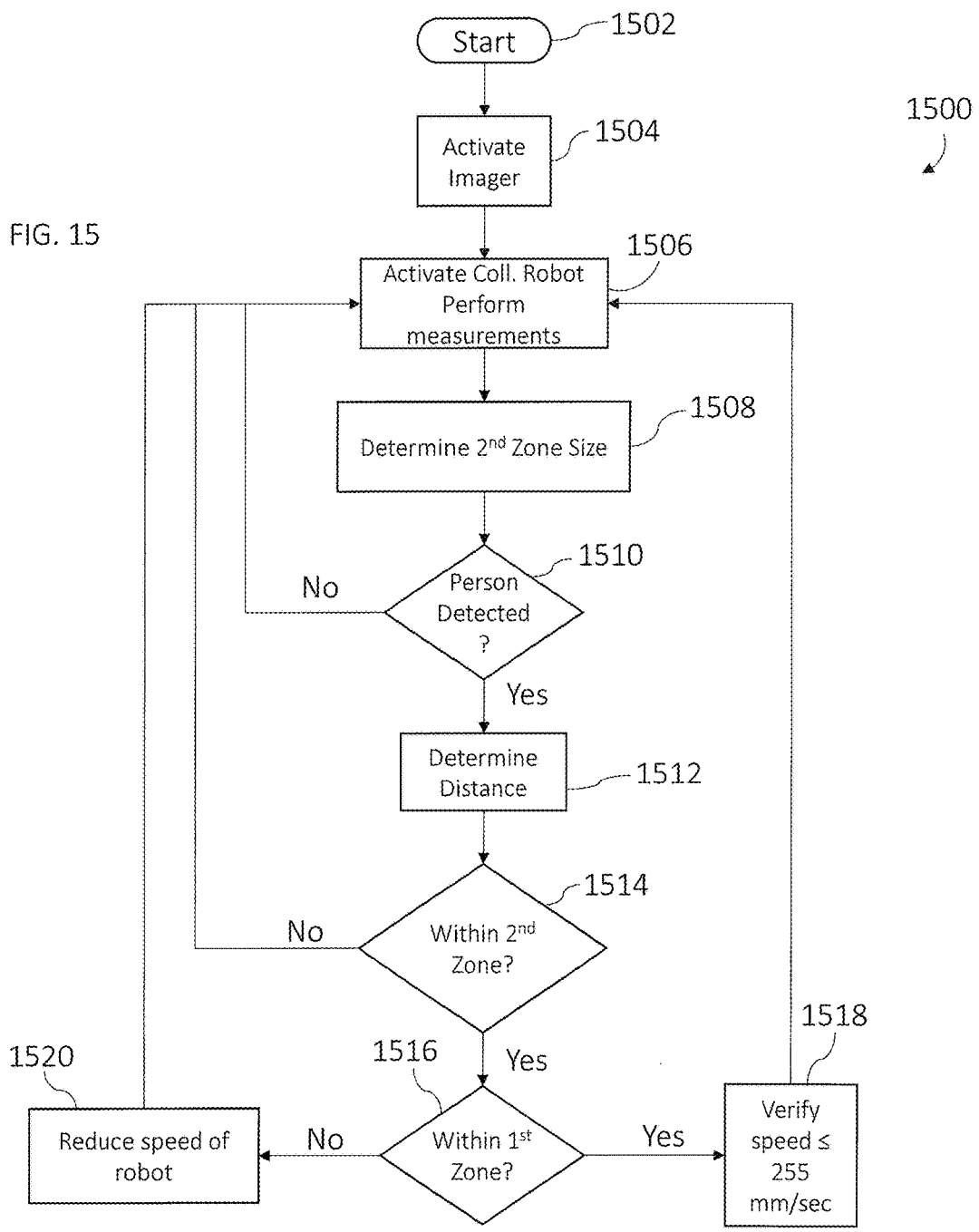
FIG. 15 is a flow diagram illustrating a method of operating the measurement system of FIG. 1.

The LAN interface device provides for communication between controller 48 and the LAN in a data communications protocol supported by LAN. The ROM device stores an application code, e.g., main functionality firmware, including initializing parameters, and boot code, for the processor. Application code also includes program instructions as shown in FIG. 15 for causing the processor to execute any operation control methods, including starting and stopping operation, changing operational states of robotic arm 50 or 3D imager 60, monitoring predetermined operating parameters such determining the location of human persons adjacent the system 20, and generation of alarms. The information to be exchanged remote computers and the controller 48 include but are not limited to 3D coordinate data, operational state of 3D imager 60, and operational state of the robotic arm 50.

The NVM device is any form of non-volatile memory such as an EPROM (Erasable Programmable Read Only Memory) chip, a disk drive, or the like. Stored in NVM device are various operational parameters for the application code. The various operational parameters can be input to NVM device either locally, using a keypad, a connected computer (wired or wirelessly), a portable computing device (e.g. a table computer or a cellular phone), a remote computer, or remotely via the Internet using a remote computer. It will be recognized that application code can be stored in the NVM device rather than the device.

Controller 48 includes operation control methods embodied in application code shown in FIG. 15. These methods are embodied in computer instructions written to be executed by processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

It should be appreciated that while controller 48 is described herein as being a single processing device, this is for exemplary purposes and the claimed invention should not be so limited. In other embodiments, the controller 48 may include one or more processors. The one or more processors may be co-located, such as in stop member 44 for example, or distributed with some of the processors being remotely located from the stop member 44. Further, the controller 48 may be partially or completely separate from the stop member 44.

The system 20 may include other features to allow a human operator to either interact with, or know the status of the system 20. In an embodiment, stop buttons 62 may be arranged on each side of the frame member 26. Further, lights 64 may be arranged on each side of the frame member 26. In an embodiment, the lights 4 are LED lights operable to change color (e.g in response to a signal from the controller 48) based on the operating state of the system 20. In an embodiment, the lights 64 will be blue when in a waiting state (e.g. robotic arm 50 is locked in position), amber when in a ready to operate state (e.g. the robotic arm 50 is released for movement, but not yet moving) and red when in a stopped/safety state.

Figure 6:
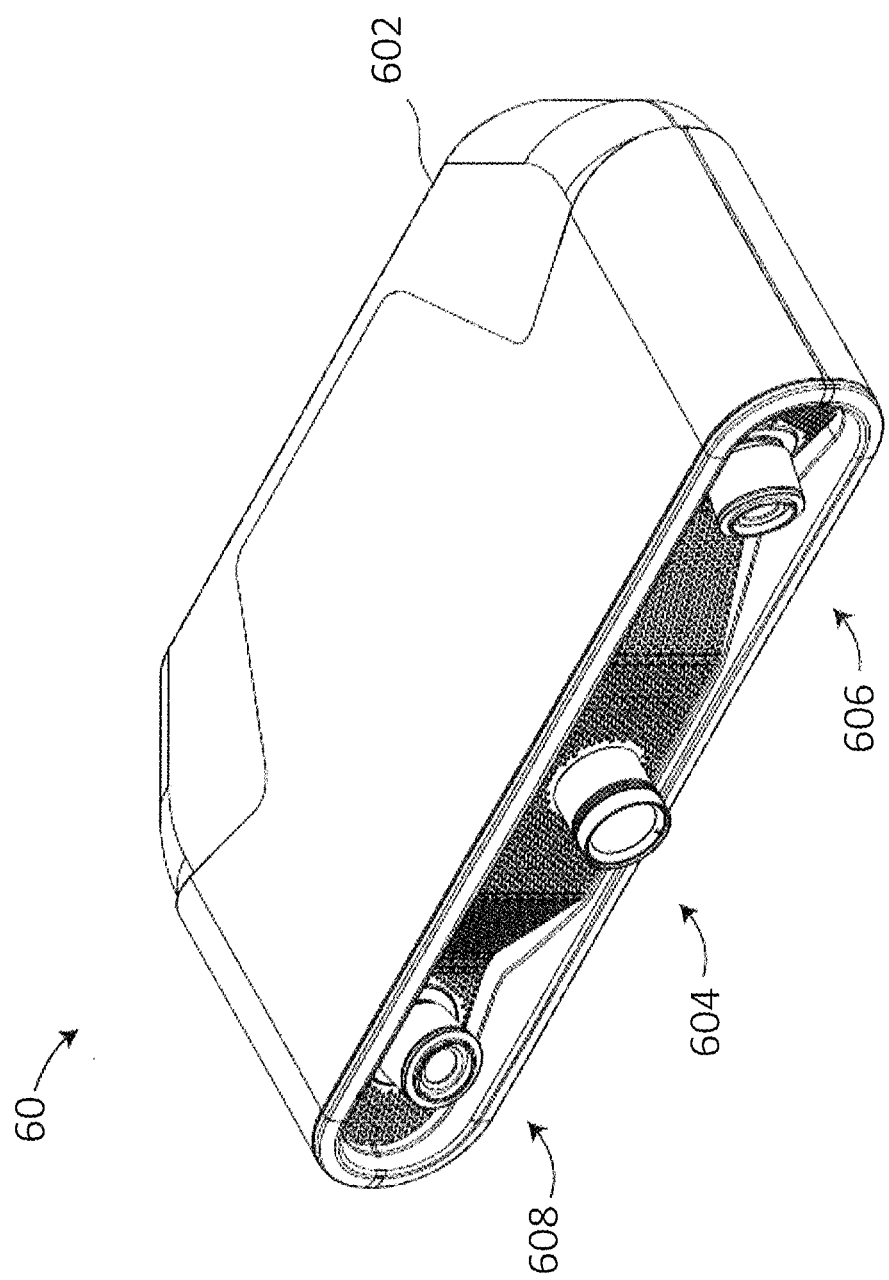
FIG. 6 is a perspective view of a 3D imager according to an embodiment.

Referring now to FIG. 6 is a perspective view of a 3D imager 60 is shown according to an embodiment. It includes a frame 602, a projector 604, a first camera assembly 606, and a second camera assembly 608. The 3D imager 60 may be the same as that described in commonly owned United States Patent Publication 2017/0054965A1, the contents of which are incorporated by reference herein.

Figure 7:
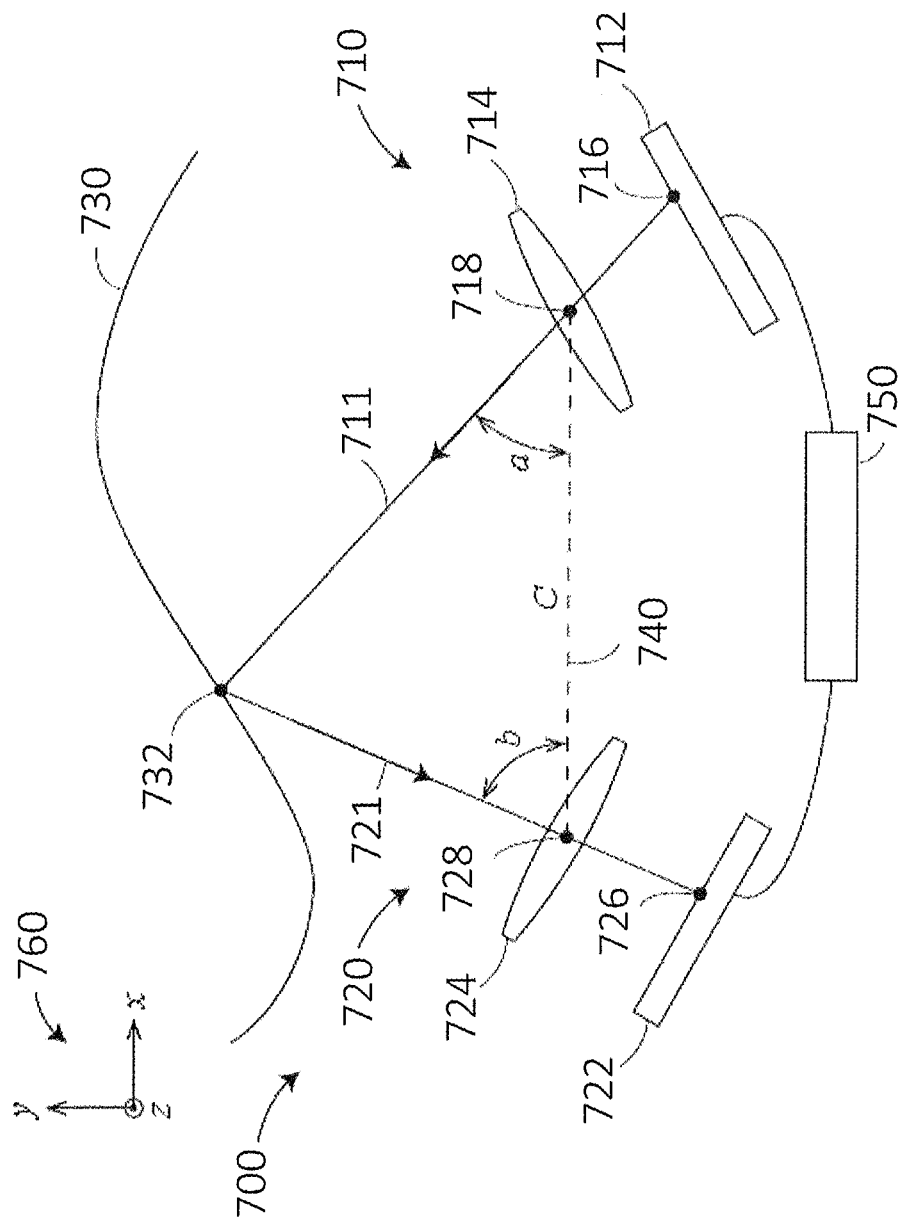
FIG. 7 is a schematic illustration of the principle of operation of a triangulation scanner having a camera and a projector according to an embodiment.

FIG. 7 shows a structured light triangulation scanner 700 that projects a pattern of light over an area on a surface 730. The scanner, which has a frame of reference 760, includes a projector 710 and a camera 720. The projector 710 includes an illuminated projector pattern generator 712, a projector lens 714, and a perspective center 718 through which a ray of light 711 emerges. The ray of light 711 emerges from a corrected point 716 having a corrected position on the pattern generator 712. In an embodiment, the point 716 has been corrected to account for aberrations of the projector, including aberrations of the lens 714, in order to cause the ray to pass through the perspective center, thereby simplifying triangulation calculations.

The ray of light 711 intersects the surface 730 in a point 732, which is reflected (scattered) off the surface and sent through the camera lens 724 to create a clear image of the pattern on the surface 730 on the surface of a photosensitive array 722. The light from the point 732 passes in a ray 721 through the camera perspective center 728 to form an image spot at the corrected point 726. The image spot is corrected in position to correct for aberrations in the camera lens. A correspondence is obtained between the point 726 on the photosensitive array 722 and the point 716 on the illuminated projector pattern generator 712. As explained herein below, the correspondence may be obtained by using a coded or an uncoded (sequentially projected) pattern. Once the correspondence is known, the angles a and b in FIG. 9 may be determined. The baseline 740, which is a line segment drawn between the perspective centers 718 and 728, has a length C. Knowing the angles a, b and the length C, all the angles and side lengths of the triangle 728-732-718 may be determined. Digital image information is transmitted to a processor 750, which determines 3D coordinates of the surface 730. The processor 750 may also instruct the illuminated pattern generator 712 to generate an appropriate pattern. The processor 750 may be located within the scanner assembly, in controller 48, an external computer, or a remote server.

As used herein, the term "pose" refers to a combination of a position and an orientation. In embodiment, the position and the orientation are desired for the camera and the projector in a frame of reference of the 3D imager 700. Since a position is characterized by three translational degrees of freedom (such as x, y, z) and an orientation is composed of three orientational degrees of freedom (such as roll, pitch, and yaw angles), the term pose defines a total of six degrees of freedom. In a triangulation calculation, a relative pose of the camera and the projector are desired within the frame of reference of the 3D imager. As used herein, the term "relative pose" is used because the perspective center of the camera or the projector can be located on an (arbitrary) origin of the 3D imager system; one direction (say the x axis) can be selected along the baseline; and one direction can be selected perpendicular to the baseline and perpendicular to an optical axis. In most cases, a relative pose described by six degrees of freedom is sufficient to perform the triangulation calculation. For example, the origin of a 3D imager can be placed at the perspective center of the camera. The baseline (between the camera perspective center and the projector perspective center) may be selected to coincide with the x axis of the 3D imager. The y axis may be selected perpendicular to the baseline and the optical axis of the camera. Two additional angles of rotation are used to fully define the orientation of the camera system. Three additional angles or rotation are used to fully define the orientation of the projector. In this embodiment, six degrees-of-freedom define the state of the 3D imager: one baseline, two camera angles, and three projector angles. In other embodiment, other coordinate representations are possible.

Figure 8:
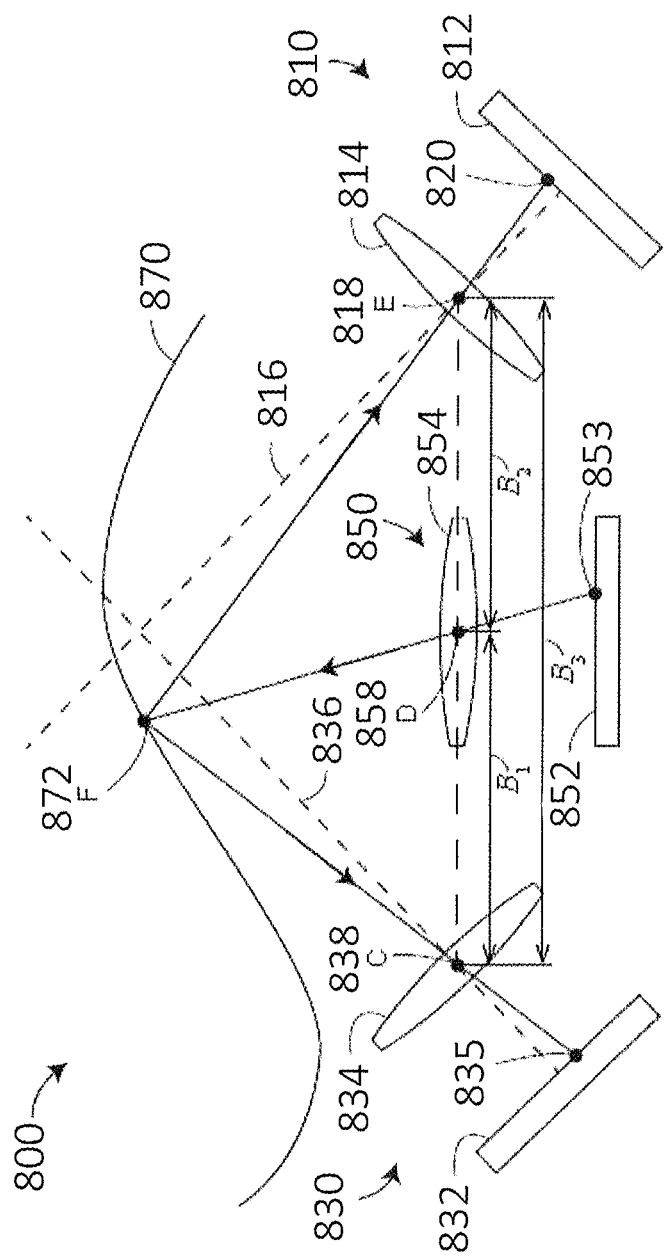
FIG. 8 is a schematic illustration of the principle of operation of a triangulation scanner having two cameras and one projector according to an embodiment.

Referring now to FIG. 8 a structured light triangulation scanner 800 is shown having a projector 850, a first camera 810, and a second camera 830. The projector creates a pattern of light on a pattern generator plane 852, which it projects from a corrected point 853 on the pattern through a perspective center 858 (point D) of the lens 854 onto an object surface 870 at a point 872 (point F). The point 872 is imaged by the first camera 810 by receiving a ray of light from the point 872 through a perspective center 818 (point E) of a lens 814 onto the surface of a photosensitive array 812 of the camera as a corrected point 820. The point 820 is corrected in the read-out data by applying a correction factor to remove the effects of lens aberrations. The point 872 is likewise imaged by the second camera 830 by receiving a ray of light from the point 872 through a perspective center 838 (point C) of the lens 834 onto the surface of a photosensitive array 832 of the second camera as a corrected point 835.

The inclusion of two cameras 810 and 830 in the system 800 provides advantages over the device of FIG. 8 that includes a single camera. One advantage is that each of the two cameras has a different view of the point 872 (point F). Because of this difference in viewpoints, it is possible in some cases to see features that would otherwise be obscured—for example, seeing into a hole or behind a blockage. In addition, it is possible in the system 800 of FIG. 8 to perform three triangulation calculations rather than a single triangulation calculation, thereby improving measurement accuracy. A first triangulation calculation can be made between corresponding points in the two cameras using the triangle CEF with the baseline $B_3$. A second triangulation calculation can be made based on corresponding points of the first camera and the projector using the triangle DEF with the baseline $B_2$. A third triangulation calculation can be made based on corresponding points of the second camera and the projector using the triangle CDF with the baseline $B_1$. The optical axis of the first camera 820 is 816, and the optical axis of the second camera 830 is 836.

Figure 9:
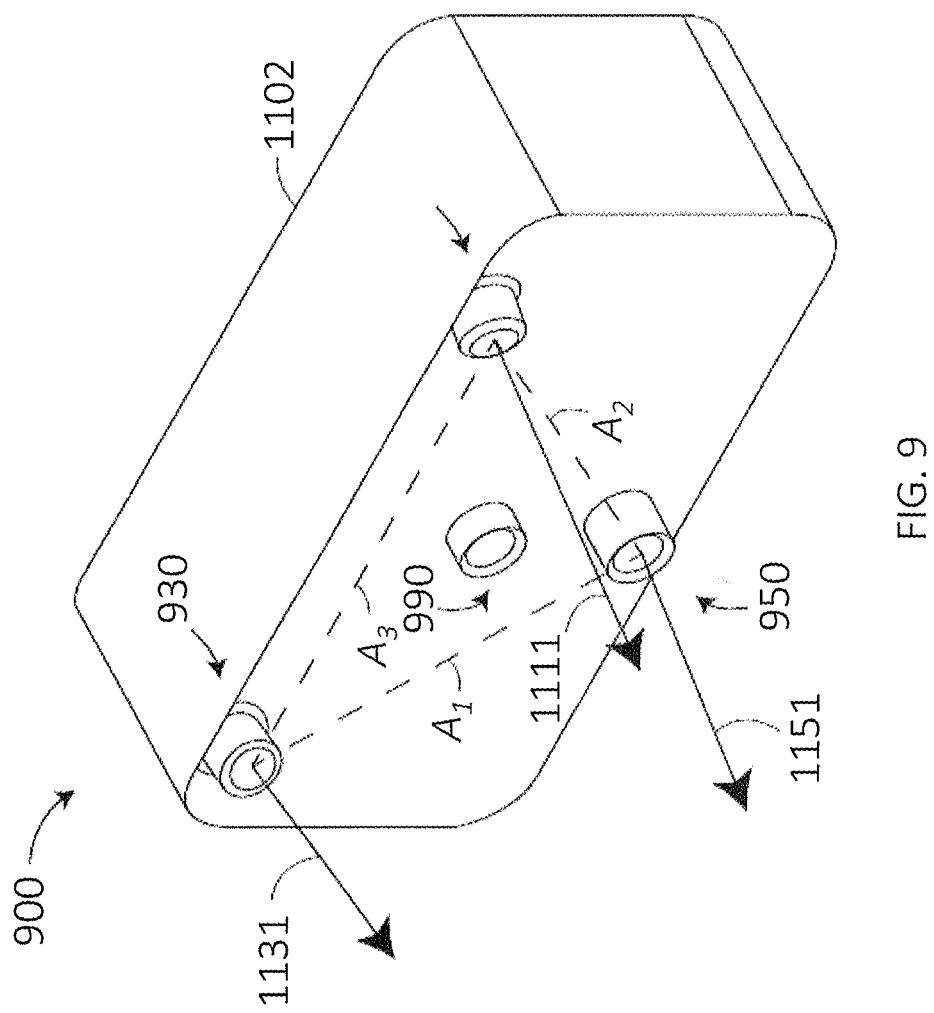
FIG. 9 is a perspective view of a scanner having two cameras and one projector arranged in a triangle for 3D measurement according to an embodiment.

FIG. 9 shows 3D imager 900 having two cameras 910, 930 and a projector 950 arranged in a triangle $A_1$-$A_2$-$A_3$. In an embodiment, the 3D imager 900 further includes a camera 990 that may be used to provide color (texture) information for incorporation into the 3D image. In addition, the camera 990 may be used to register multiple 3D images through the use of videogrammetry.

This triangular arrangement provides additional information beyond that available for two cameras and a projector arranged in a straight line as illustrated in FIG. 6 and FIG.

Figure 10:
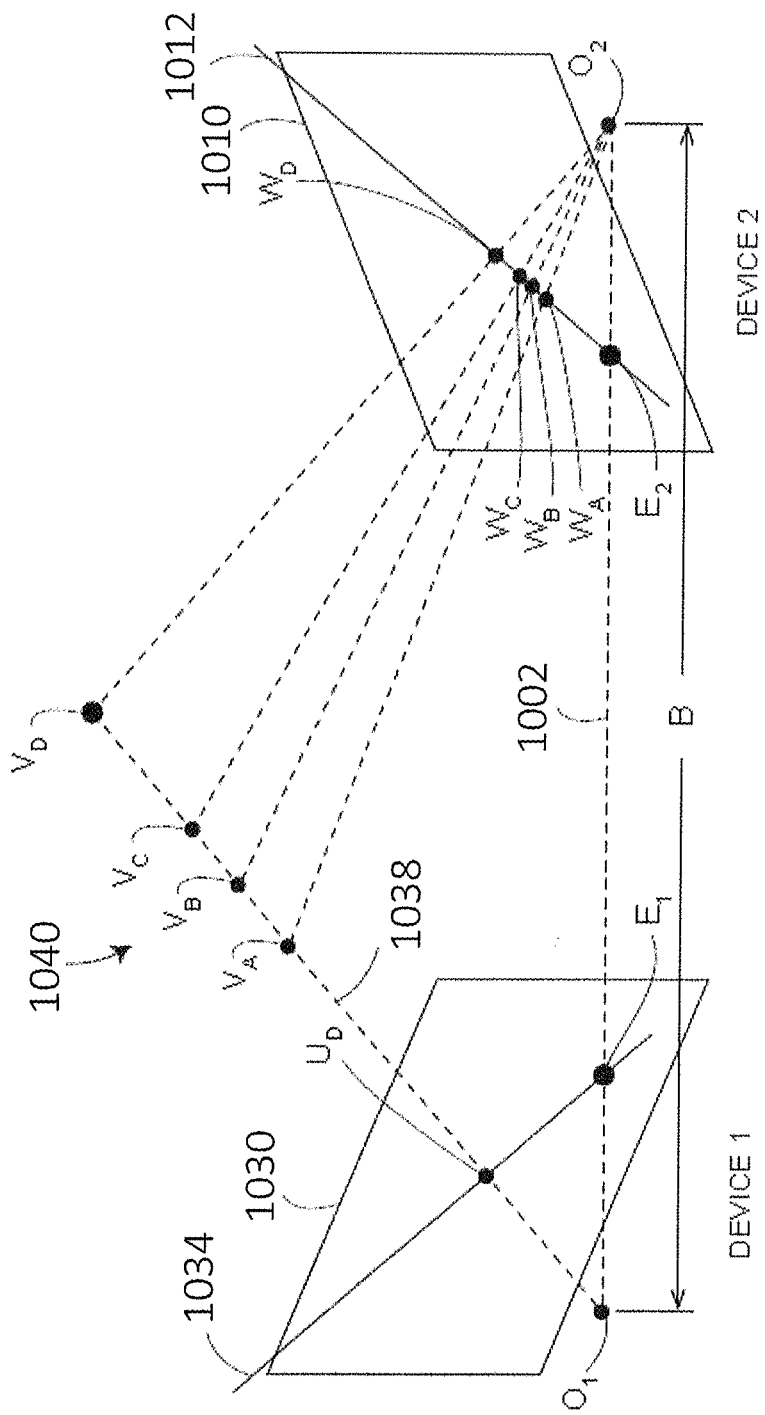
FIGS. 10 and 11 are schematic illustrations of the principle of operation of the scanner of FIG. 9.

8. The additional information may be understood in reference to FIG. 10, which explain the concept of epipolar constraints, and FIG. 11 that explains how epipolar constraints are advantageously applied to the triangular arrangement of the 3D imager 900. In FIG. 10, a 3D triangulation instrument 1040 includes a device 1 and a device 2 on the left and right sides of FIG. 10, respectively. Device 1 and device 2 may be two cameras or device 1 and device 2 may be one camera and one projector. Each of the two devices, whether a camera or a projector, has a perspective center, $O_1$ and $O_2$, and a representative plane, 1030 or 1010. The perspective centers are separated by a baseline distance B, which is the length of the line 1002. Basically, the perspective centers $O_1$, $O_2$ are points through which rays of light may be considered to travel, either to or from a point on an object. These rays of light either emerge from an illuminated projector pattern, such as the pattern on illuminated projector pattern generator 712 of FIG. 7, or impinge on a photosensitive array, such as the photosensitive array 722 of FIG. 7. As can be seen in FIG. 7, the lens 714 lies between the illuminated object point 732 and plane of the illuminated object projector pattern generator 712. Likewise, the lens 724 lies between the illuminated object point 732 and the plane of the photosensitive array 722, respectively. However, the pattern of the front surface planes of devices 712 and 722 would be the same if they were moved to appropriate positions opposite the lenses 714 and 724, respectively. This placement of the reference planes 1030, 1010 is applied in FIG. 10, which shows the reference planes 1030, 1010 between the object point and the perspective centers $O_1$, $O_2$.

In FIG. 10, for the reference plane 1030 angled toward the perspective center $O_2$ and the reference plane 1010 angled toward the perspective center $O_1$, a line 1002 drawn between the perspective centers $O_1$ and $O_2$ crosses the planes 1030 and 1010 at the epipole points $E_1$, $E_2$, respectively. Consider a point $U_D$ on the plane 1030. If device 1 is a camera, it is known that an object point that produces the point $U_D$ on the image lies on the line 1038. The object point might be, for example, one of the points $V_A$, $V_B$, $V_C$, or $V_D$. These four object points correspond to the points $W_A$, $W_B$, $W_C$, $W_D$, respectively, on the reference plane 1010 of device 2. This is true whether device 2 is a camera or a projector. It is also true that the four points lie on a straight line 1012 in the plane 1010. This line, which is the line of intersection of the reference plane 1010 with the plane of $O_1$-$O_2$-$U_D$, is referred to as the epipolar line 1012. It follows that any epipolar line on the reference plane 1010 passes through the epipole $E_2$. Just as there is an epipolar line on the reference plane of device 2 for any point on the reference plane of device 1, there is also an epipolar line 1034 on the reference plane of device 1 for any point on the reference plane of device 2.

Figure 11:
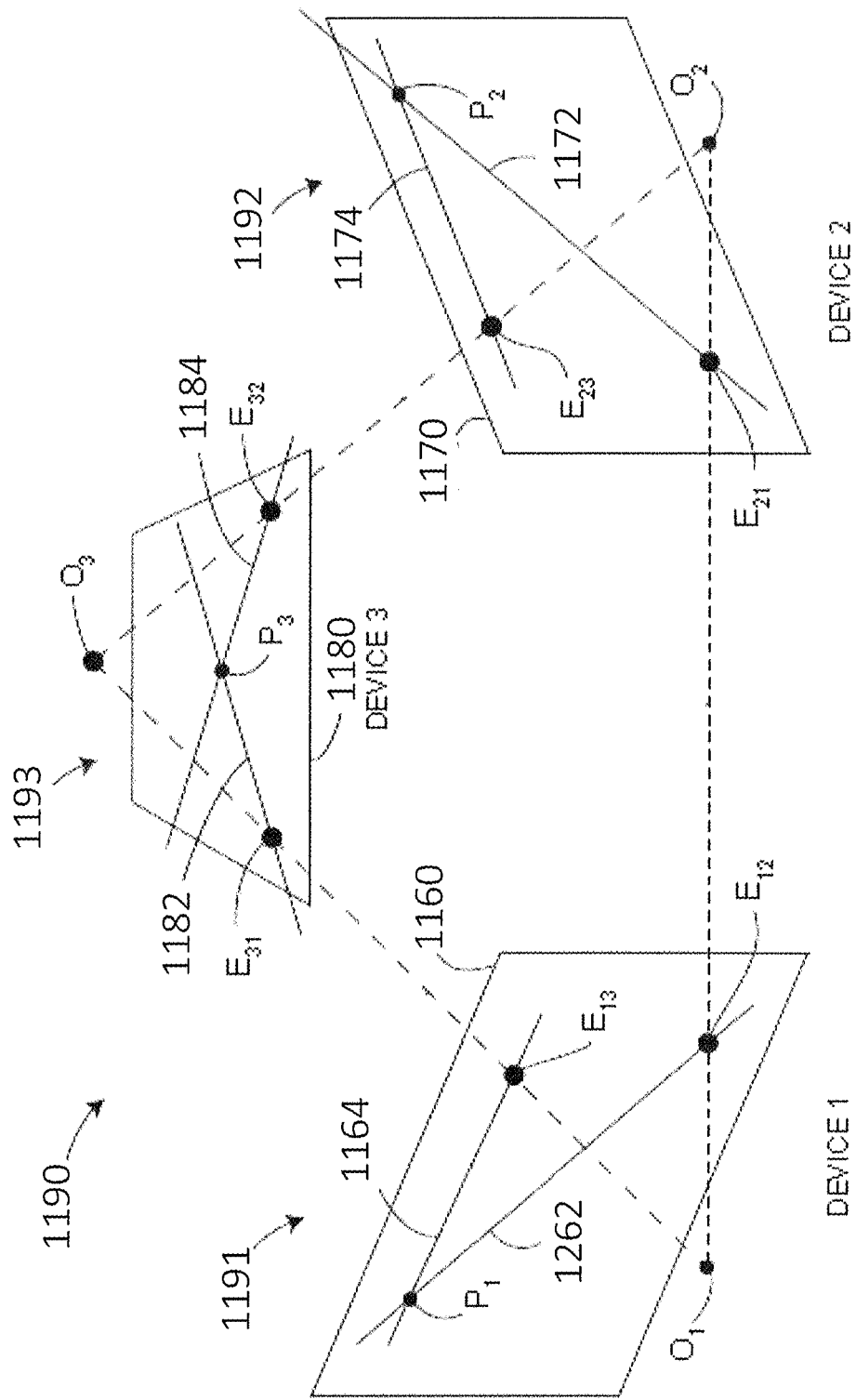

FIG. 11 illustrates the epipolar relationships for a 3D imager 1090 corresponding to 3D imager 900 of FIG. 9 in which two cameras and one projector are arranged in a triangular pattern. In general, the device 1, device 2, and device 3 may be any combination of cameras and projectors as long as at least one of the devices is a camera. Each of the three devices 1191, 1192, 1193 has a perspective center $O_1$, $O_2$, $O_3$, respectively, and a reference plane 1160, 1170, and 1180, respectively. Each pair of devices has a pair of epipoles. Device 1 and device 2 have epipoles $E_{12}$, $E_{21}$ on the planes 1160, 1170, respectively. Device 1 and device 3 have epipoles $E_{13}$, $E_{31}$, respectively on the planes 1160, 1180, respectively. Device 2 and device 3 have epipoles $E_{23}$, $E_{32}$ on the planes 1170, 1180, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the situation of FIG. 11 in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 1160 to obtain the epipolar line 1164. Intersect the plane $P_2$-$E_{21}$-$E_{12}$ to obtain the epipolar line 1162. If the image point $P_1$ has been determined consistently, the observed image point $P_1$ will lie on the intersection of the determined epipolar lines 1162 and 1164.

To check the consistency of the image point $P_2$, intersect the plane $P_3$-$E_{32}$-$E_{23}$ with the reference plane 1170 to obtain the epipolar line 1174. Intersect the plane $P_1$-$E_{12}$-$E_{21}$ to obtain the epipolar line 1172. If the image point $P_2$ has been determined consistently, the observed image point $P_2$ will lie on the intersection of the determined epipolar lines 1172 and 1174.

To check the consistency of the projection point $P_3$, intersect the plane $P_2$-$E_{23}$-$E_{32}$ with the reference plane 1180 to obtain the epipolar line 1184. Intersect the plane $P_1$-$E_{13}$-$E_{31}$ to obtain the epipolar line 1182. If the projection point $P_3$ has been determined consistently, the projection point $P_3$ will lie on the intersection of the determined epipolar lines 1182 and 1184.

The redundancy of information provided by using a 3D imager 900 having a triangular arrangement of projector and cameras may be used to reduce measurement time, to identify errors, and to automatically update compensation/calibration parameters.

One method of determining 3D coordinates is by performing sequential measurements. An example of such a sequential measurement method described herein below is to project a sinusoidal measurement pattern three or more times, with the phase of the pattern shifted each time. In an embodiment, such projections may be performed first with a coarse sinusoidal pattern, followed by a medium-resolution sinusoidal pattern, followed by a fine sinusoidal pattern. In this instance, the coarse sinusoidal pattern is used to obtain an approximate position of an object point in space. The medium-resolution and fine patterns used to obtain increasingly accurate estimates of the 3D coordinates of the object point in space. In an embodiment, redundant information provided by the triangular arrangement of the 3D imager 900 eliminates the step of performing a coarse phase measurement. Instead, the information provided on the three reference planes 1160, 1170, and 1180 enables a coarse determination of object point position. One way to make this coarse determination is by iteratively solving for the position of object points based on an optimization procedure. For example, in one such procedure, a sum of squared residual errors is minimized to select the best-guess positions for the object points in space.

The triangular arrangement of 3D imager 1190 may also be used to help identify errors. For example, a projector 1193 in a 3D imager 900 may project a coded pattern onto an object in a single shot with a first element of the pattern having a projection point $P_3$. The first camera 1191 (FIG. 11) may associate a first image point $P_1$ on the reference plane 1160 with the first element. The second camera 1192 may associate the first image point $P_2$ on the reference plane 1170 with the first element. The six epipolar lines may be generated from the three points $P_1$, $P_2$, and $P_3$ using the method described herein above. The intersection of the epipolar lines lie on the corresponding points $P_1$, $P_2$, and $P_3$ for the solution to be consistent. If the solution is not consistent, additional measurements of other actions may be advisable.

The triangular arrangement of the 3D imager 900 may also be used to automatically update compensation/calibration parameters. Compensation parameters are numerical values stored in memory, for example, in the controller 48 or in another external computing unit. Such parameters may include the relative positions and orientations of the cameras and projector in the 3D imager.

The compensation parameters may relate to lens characteristics such as lens focal length and lens aberrations. They may also relate to changes in environmental conditions such as temperature. Sometimes the term calibration is used in place of the term compensation. Often compensation procedures are performed by the manufacturer to obtain compensation parameters for a 3D imager. In addition, compensation procedures are often performed by a user. User compensation procedures may be performed when there are changes in environmental conditions such as temperature. User compensation procedures may also be performed when projector or camera lenses are changed or after then instrument is subjected to a mechanical shock. Typically user compensations may include imaging a collection of marks on a calibration plate.

It should be appreciated that the 3D imager 60, when mounted to the robotic arm 50 may be used to automatically follow a predetermined inspection plan based on inspection data stored in the controller 48. As such, the inspection of a workpiece placed on the platform 24 may be performed consistently, reliably and quickly. Saving both time and money for the workpiece manufacturer as a result.

In some embodiments, while the robotic arm 50 is a cooperative robot and complies with the standards for working in close proximity to human operators, the end effectors mounted to the arm segment 56 are not. One of the standards of a cooperative robot is that any corner on the robot needs to have a minimum radius of 5 mm-10 mm. As a result, when an end effector, such as a 3D imager 60 is mounted to the cooperative robotic arm 50, the operation of the system 20 needs to be adjusted to avoid undesired contact between the robotic arm 50, the 3D imager 60 and the human operator.

Figure 12:
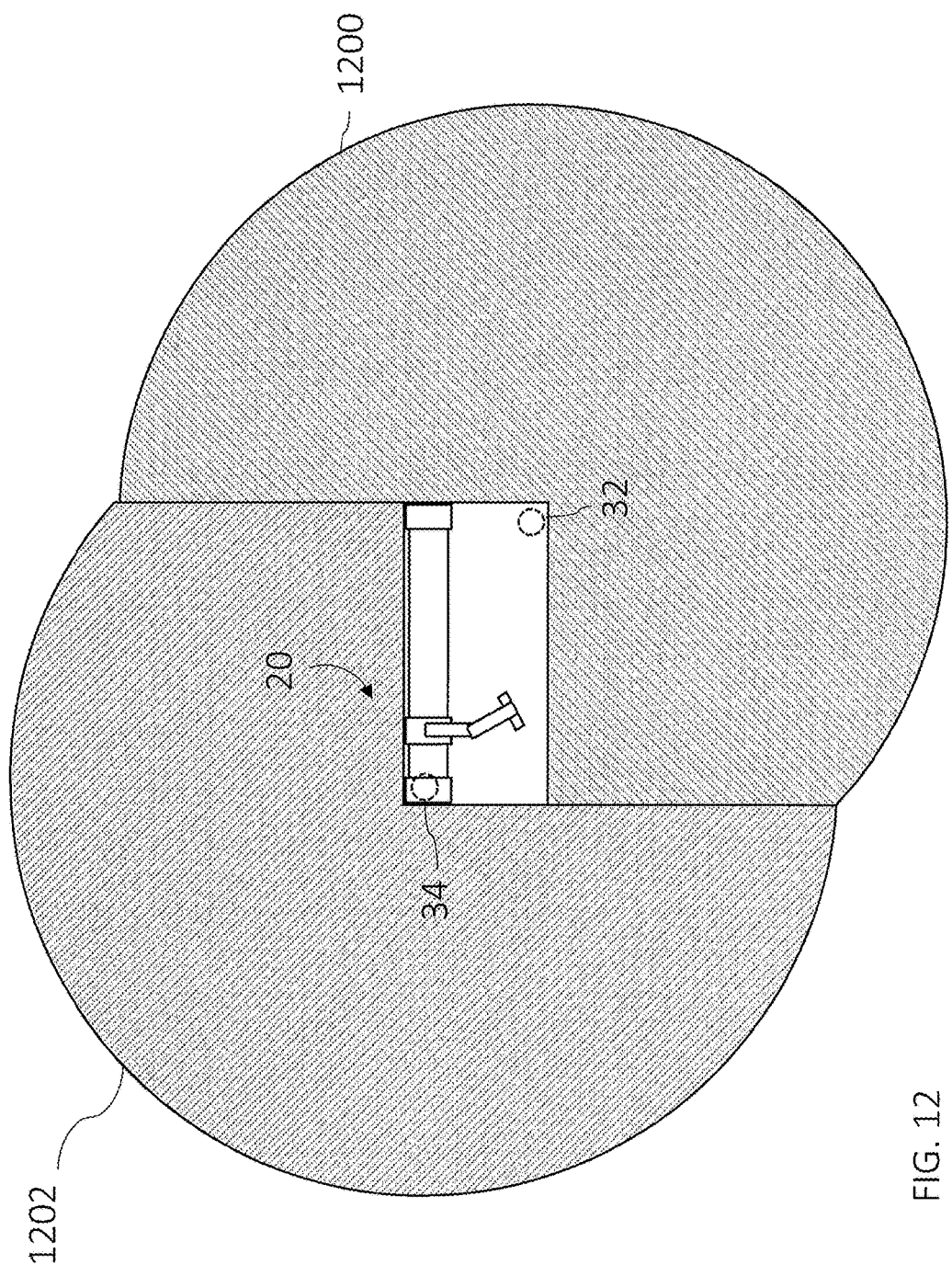
FIGS. 12-14 are top view schematic illustrations of measurement systems illustrating the monitoring of areas around the measurement system, according to embodiments.

In an embodiment, the system 20 includes two 2D optical sensors 32, 34. These sensors 32, 34 are located at opposite corners of the frame member 26 at a predetermined distance from the floor or surface that the system 20 is placed. In an embodiment, the 2D optical sensors are Hokuyo Safety Scanner UAM-05LP-T301 or Sick S300/microScan3 Core/S3000. The optical sensors 32, 34 emit light in a plane and are operable to determine a distance to an object having a surface in the plane. As shown in FIG. 12, the optical sensor 32 emits light in a plane 1200 about the system 20 and the optical sensor 32 emits a light in a plane 1202 about the system 20. In an embodiment, the planes of light 1200, 1202 are at a distance of 200 mm above the floor.

Figure 13:
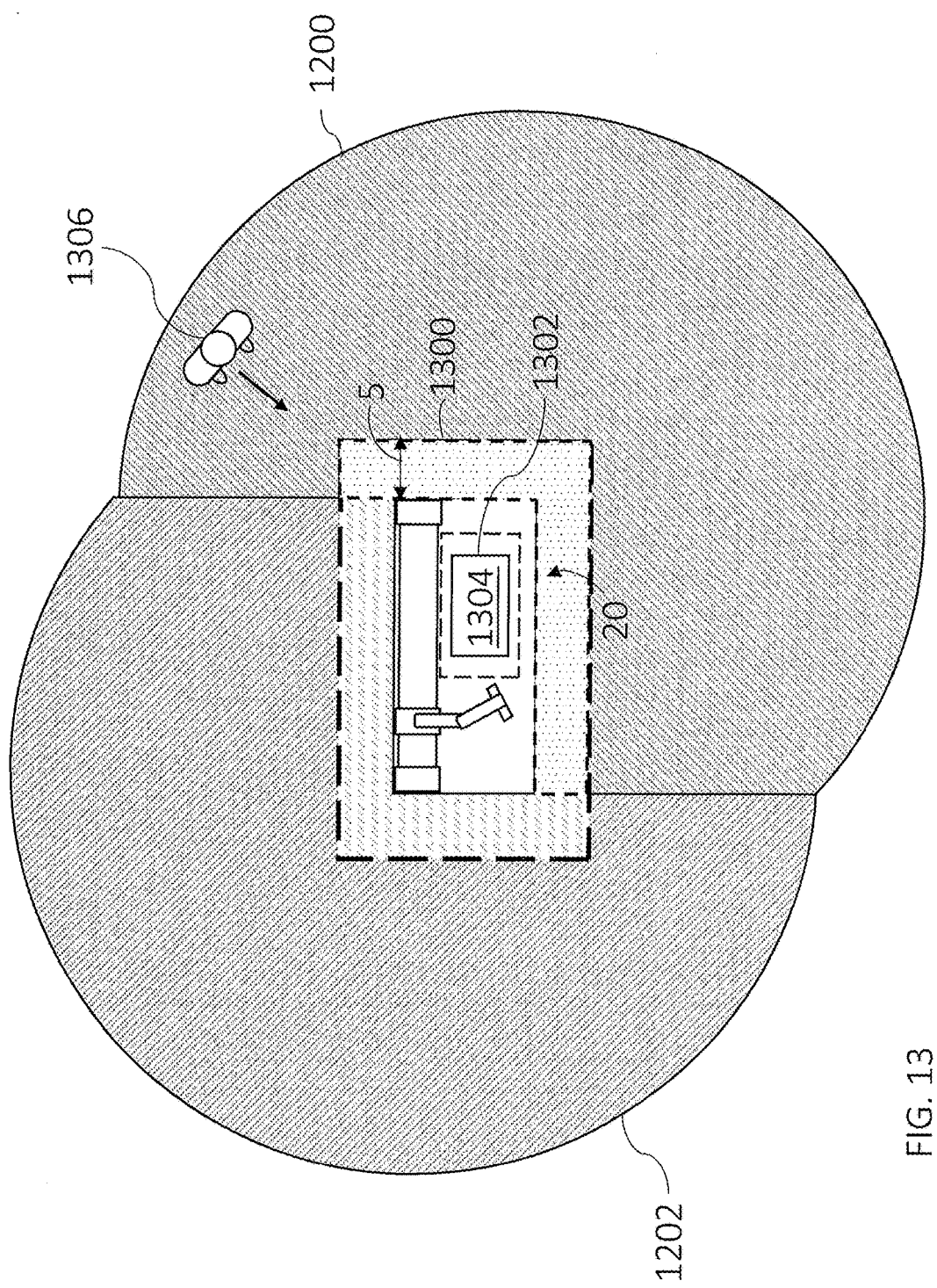
Figure 16:
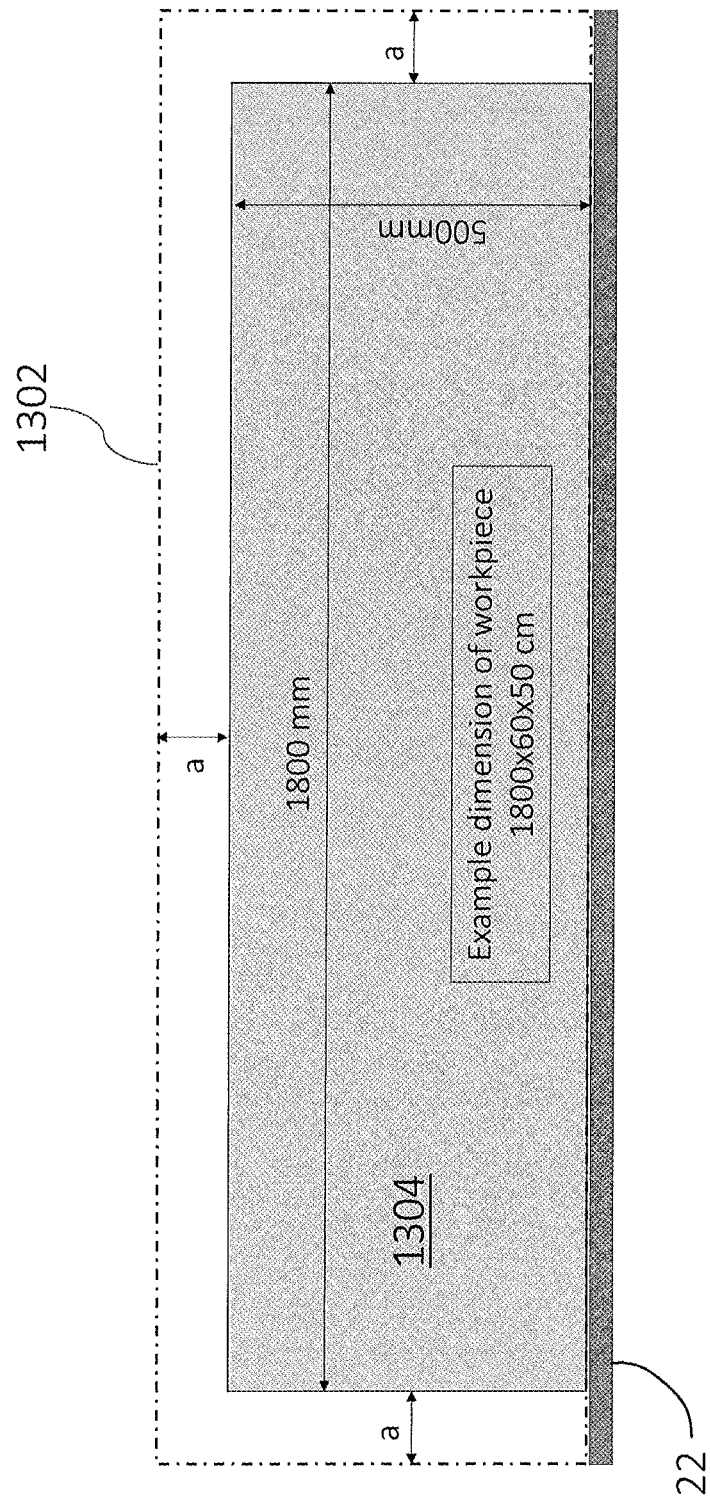
FIG. 16 is a schematic illustration of a safety zone about the measurement system, according to embodiments.

Referring now to FIG. 13, an embodiment is shown of the system 20 with a cooperative robotic arm 50 and a 3D imager 60 that has corners with radii less than 5 mm. In this embodiment, the system 20 has 2 modes of operation. In the first mode of operation, there are no human operators in proximity to the platform 22 and the robotic arm 50. In the first mode of operation, the robotic arm 50 may be operated at speeds great than a predetermined speed, such as greater than 255 mm/second. In a second mode of operation, the speed of the robotic arm 50 is adjusted based on whether the operator is in a safety or first zone 1302 (FIG. 16), or within an information or second zone 1300. The first zone 1302 is defined by a space about the workpiece 1304 that neither the robotic arm 50 nor the 3D imager 60 will enter when the system 20 is operating in the second mode (e.g. a human operator is present). In an embodiment, the first zone 1302 is defined as being equal to or greater than 100 mm from the side and top surfaces of the workpiece 1304. In one embodiment, the controller 48 verifies (either continually, periodically or aperiodically) that that speed is less than a threshold speed (e.g. less than 255 mm/second). In another embodiment, the controller 48 stops the movement of the robotic arm 50 when a human operator or a portion of the human operator is within the first zone 1302.

The second zone 1300 is determined by the controller 48 based at least in part on the speed that the robotic arm 50 is operating. In an embodiment, the size of the second zone 1300 is based at least in part on the approach speed of the human operator (K), such as operator 1306 for example, the stopping/run-down time of the robotic arm 50 and carriage 42 ($T_M$), the response time of the system 20 ($T_S$) and a reaching constant (C). The reaching constant is a variable to account for the operator 1306 extending their arm and hand. In an embodiment, the distance S from the edge of the frame member 26 is determined by the controller 48 by the following relationship:

$$S = (K^*(T_M + T_S)) + C \qquad \text{(Equation 1)}$$

In an embodiment, the approach speed K is fixed as being 1600 mm/second. In another embodiment, the approach speed K is calculated by the controller 48 based on signals from the sensors 32, 34.

For example, if the operator 1306 is moving at a speed of 1600 mm/s and the system stopping/run-down time is 0.2 ms and the response time is 0.3 ms, then the distance S=(1600 mm/s*(0.2 ms+0.3 ms))+1200 mm=2000 mm.

In one embodiment, the reaching constant C may be calculated based on the height of the plane of light 1200, 1202 from the floor. It should be appreciated that the higher off the ground the less reaching distance potential for the operator 1306. In this embodiment, the reaching constant C is determined by the relationship:

$$C = 1200 \text{ mm} - (0.4^* H_D) \qquad \text{(Equation 2)}$$

where HD is the height of the plane of light 1200, 1202 above the floor. For example, where the planes 1200, 1202 are 200 mm above the floor, the reaching constant C=1200 mm−(0.4*200 mm), or 850 mm. Thus the distance S would be 350 mm less than if the fixed constant of 1200 mm is used.

In the embodiment of FIG. 13, the second zone 1200 is a fixed distance from the sides of the frame member 26 about the perimeter system 20. If the operator 1306 was to continue moving and enter the second zone 1300, the controller 48 would decrease the speed of the robotic arm 50 from an automatic speed mode in full speed un collaborative mode to less than a predetermined threshold speed, such as 255 mm/s. In another embodiment, the system 20 stops the movement of the robotic arm 50 (e.g. 0 mm/s).

Figure 14:
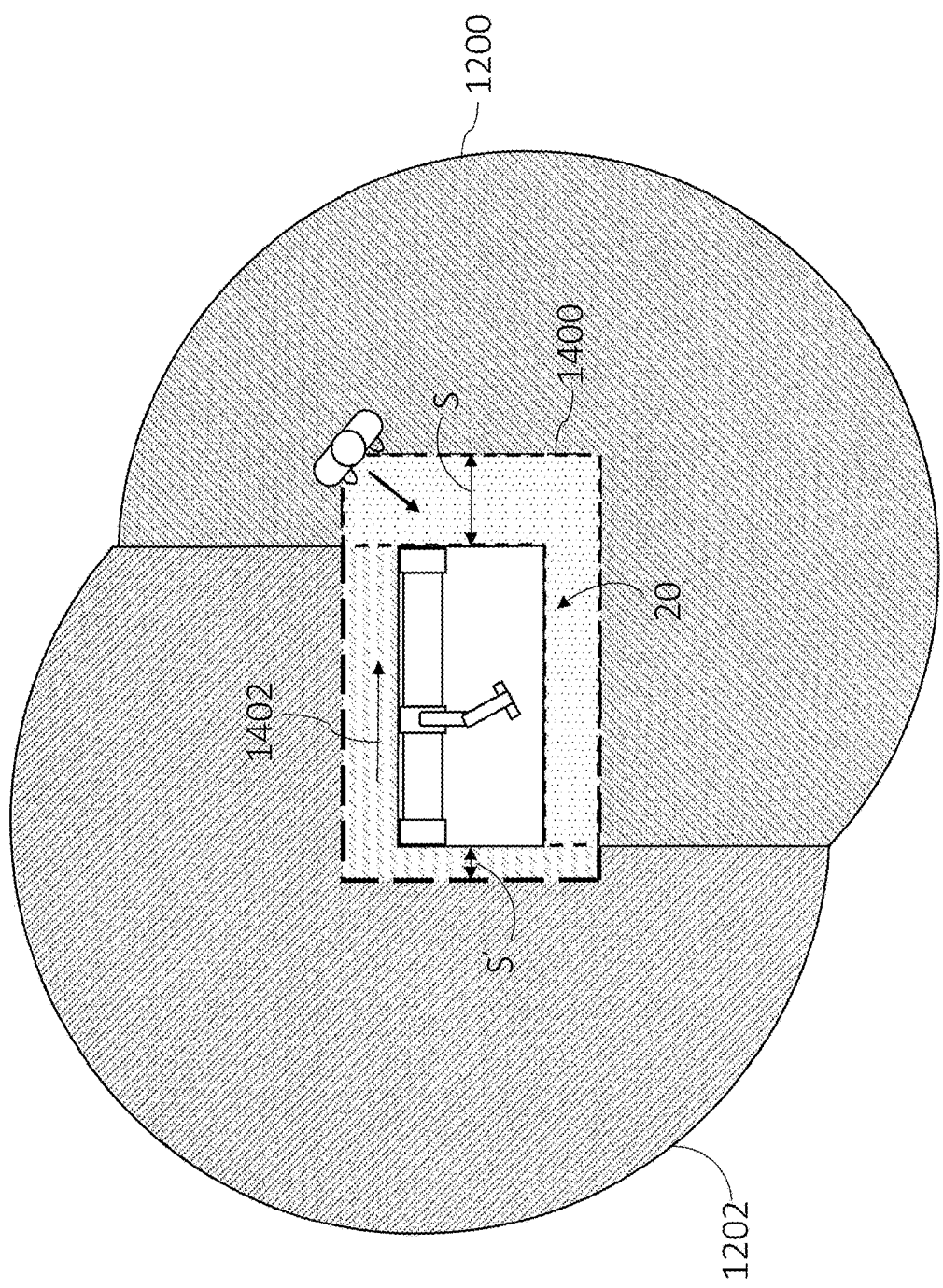

Referring now to FIG. 14, another embodiment of the system 20 is shown where the size of the second zone 1400 changes based on the position of the robotic arm 50. In this embodiment, the distance S is changed based at least in part on the movement of the robotic arm 50. As the robotic arm 50 is moved in a direction, either along the slide 40, such as in the direction indicated by arrow 1402. As the robotic arm 50 moves in a direction, the distance S along the edge in that direction extends to create a larger space in the area that the robotic arm 50 is moving towards. Similarly, the distance S' of the area the robotic arm 50 is moving away from is reduced. In an embodiment, the system 20 maintains a minimum distance S', such as 500 mm for example.

Referring now to FIG. 15, a method 1500 is shown for operating the system 20. The method 1500 starts in block 1502 and proceeds to block 1504 where the 3D imager 60 and the collaborative robotic arm 50 is activated in block 1506. It should be appreciated that the controller 48 may be preprogramed with a desired inspection plan (e.g. measurements to be made by the 3D imager 60) for the workpiece placed on the platform 24. In block 1506 the robotic arm 50 moves the 3D imager 60 to the desired locations to make measurements defined by the inspection plan. The method 1500 then proceeds to block 1508 where the distance S is determined to define the second zone. When no human operators are present or within the second zone, the system 20 operates in the first operating mode (high speed).

The method 1500 then proceeds to query block 1510 where it is determined if a human operator is detected by the optical sensors 32, 34. If query block 1510 returns a negative, the method 1500 loops back to block 1506 and the measurement of the workpiece continues. When the query block 1510 returns a positive, the method 1500 proceeds to block 1512 is determined from the optical sensors 32, 34. In one embodiment, the speed and direction of movement of the human operator is also determined. The method 1500 then proceeds to query block 1514 where it is determined if the human operator is within the second zone. When the query block 1514 returns a negative, the method 1500 loops back to block 1506 and the measurements of the workpiece continue.

When the query block 1514 returns a positive, meaning the operator is within the second zone, the method 1500 then proceeds to query block 1516. In query block 1516, it is determined if the human operator is within the first zone. If the query block 1516 returns a positive (e.g. human operator within zone one), the method 1500 proceeds to block 1518 where the speed of the robotic arm 50 is verified to be less than the threshold speed (e.g. less than 255 mm/second). In zone embodiment, the method 1500 stops (e.g. speed of 0 mm/second) the robotic arm 50 when the operator is within the first zone. The method 1500 then loops back to block 1506 and the measurements of the work piece continue. When the query block 1516 returns a negative (e.g. human operator in second zone), the method 1500 proceeds to block 1520 where a reduction of the speed of the robotic arm 50 is initiated. In one embodiment, the rate of reduction is defined to reduce the speed of the robotic arm 50 to be less than or equal to a predetermined speed (e.g. 255 mm/second) by the time the operator reaches the first zone. In an embodiment, the speed and direction of the human operator is determined.

Figure 17:
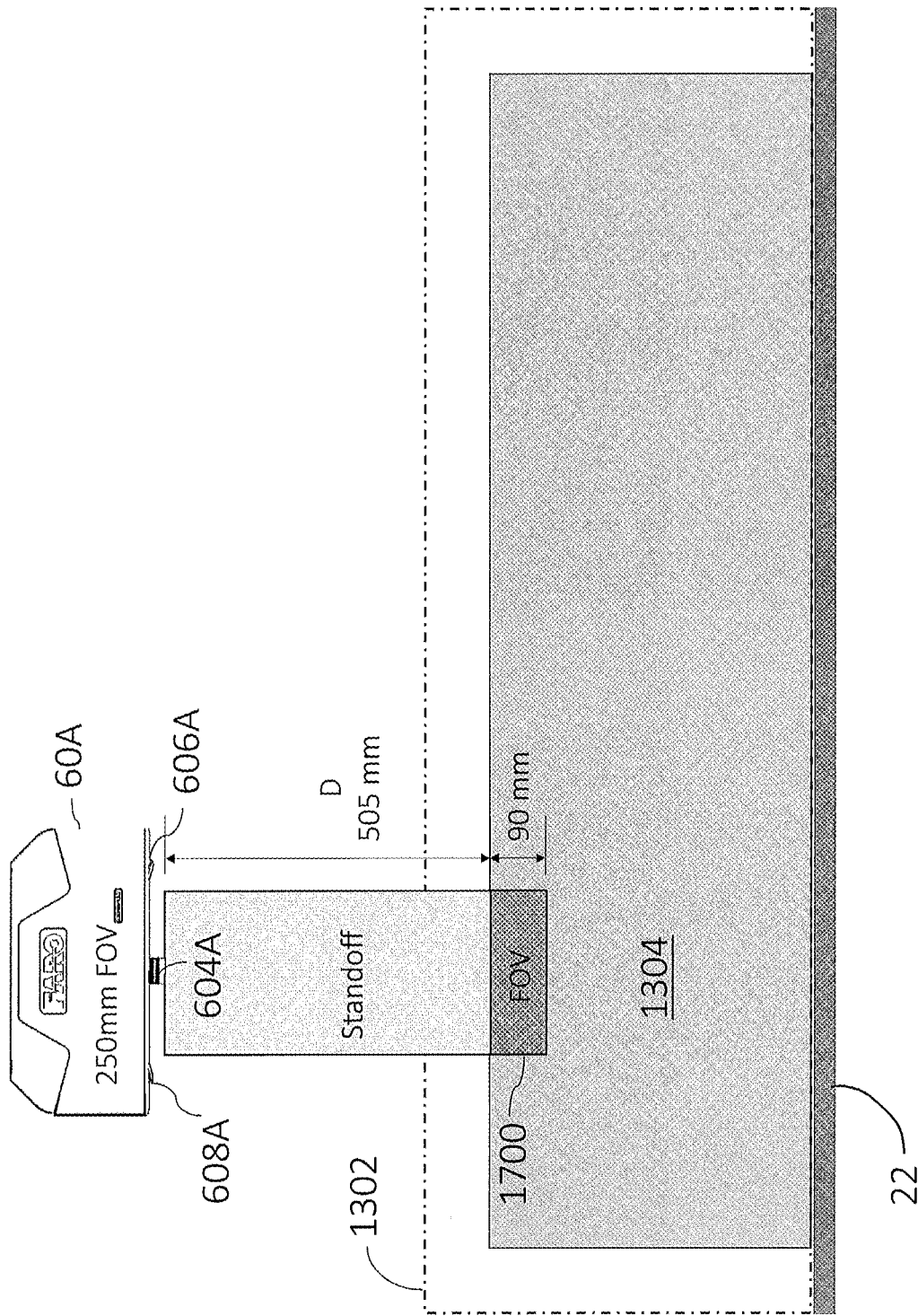
FIGS. 17-20 are schematic illustrations of the operating zones of a 3D imager, according to embodiments.
Figure 18:
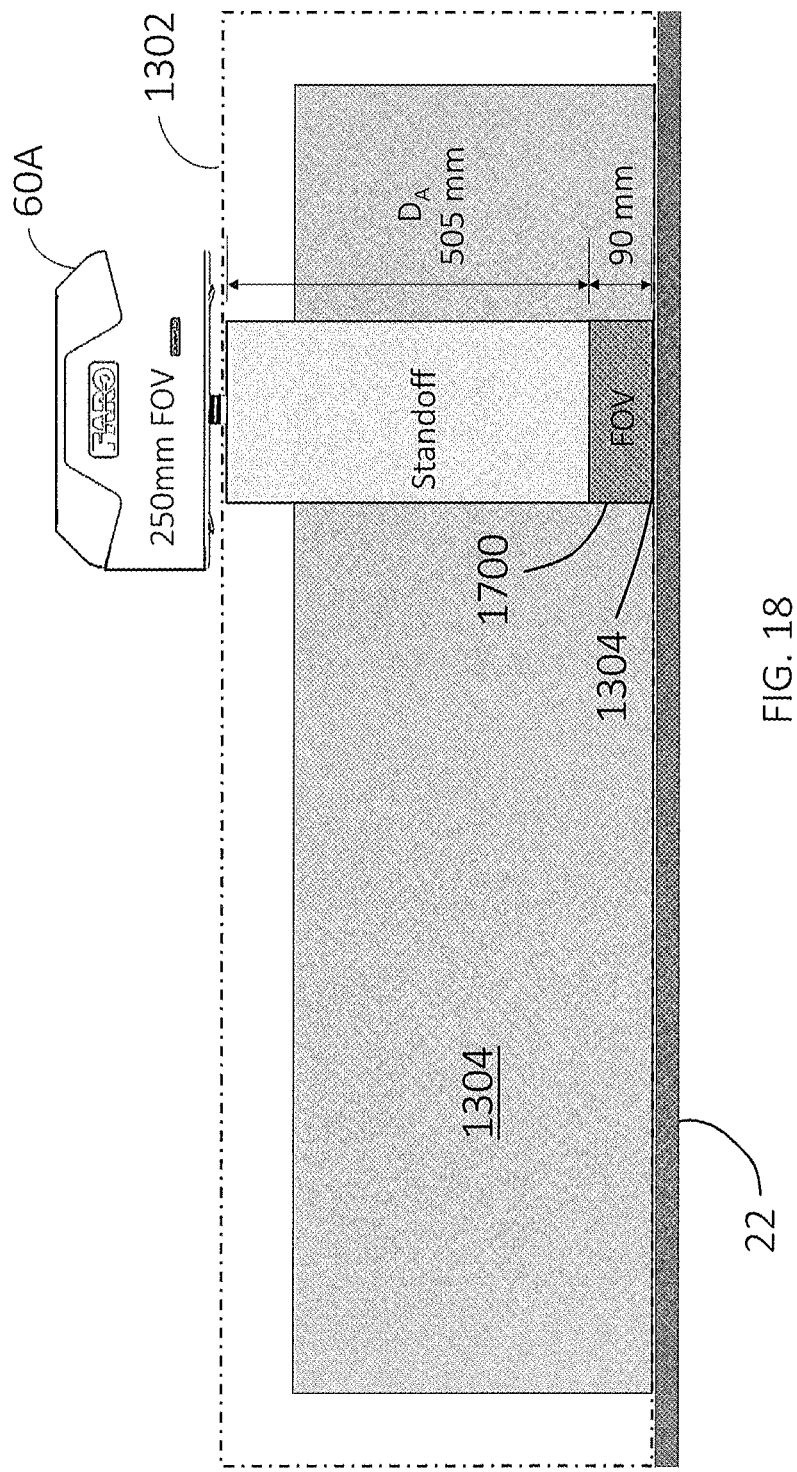
Figure 19:
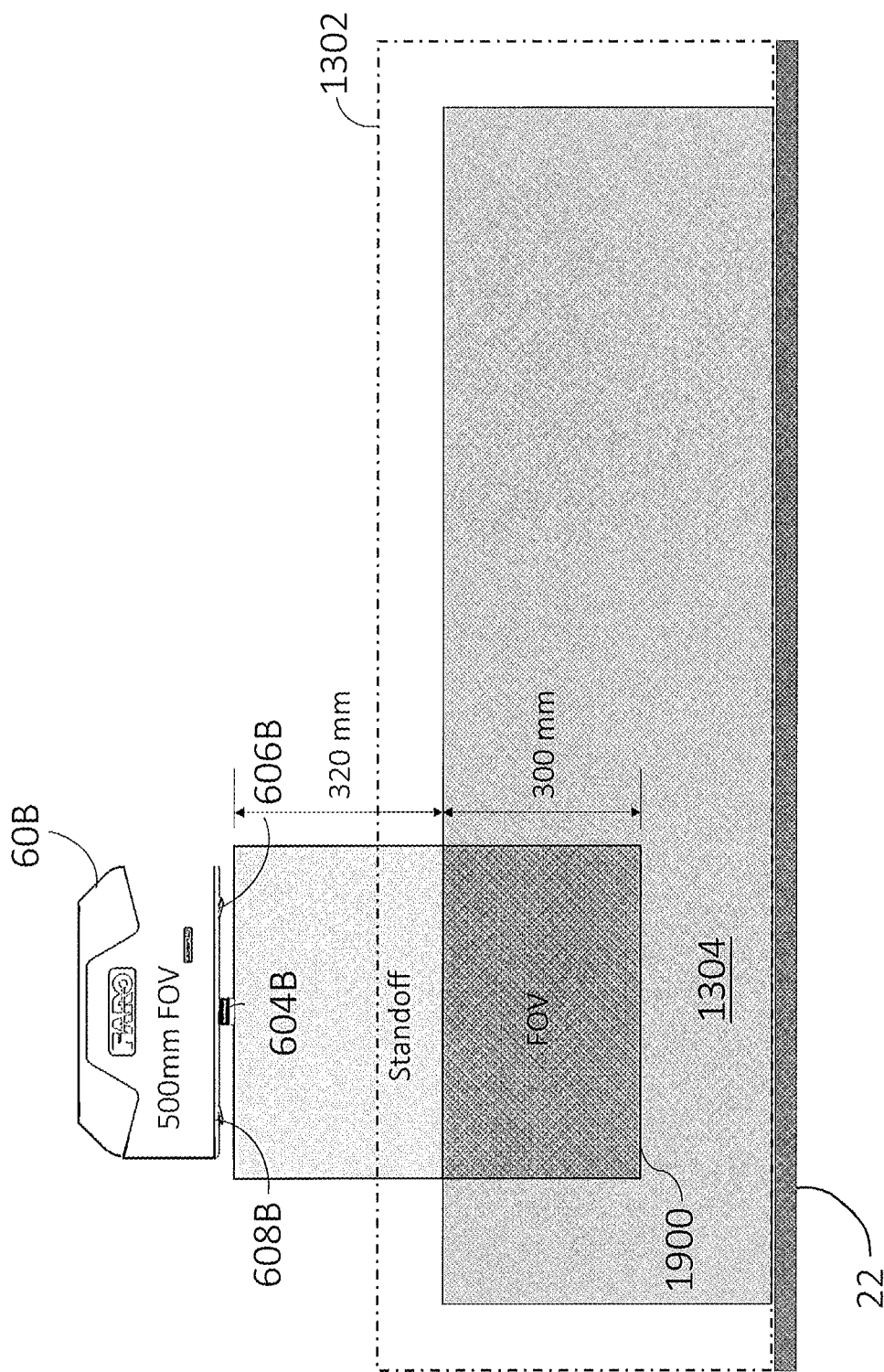
Figure 20:
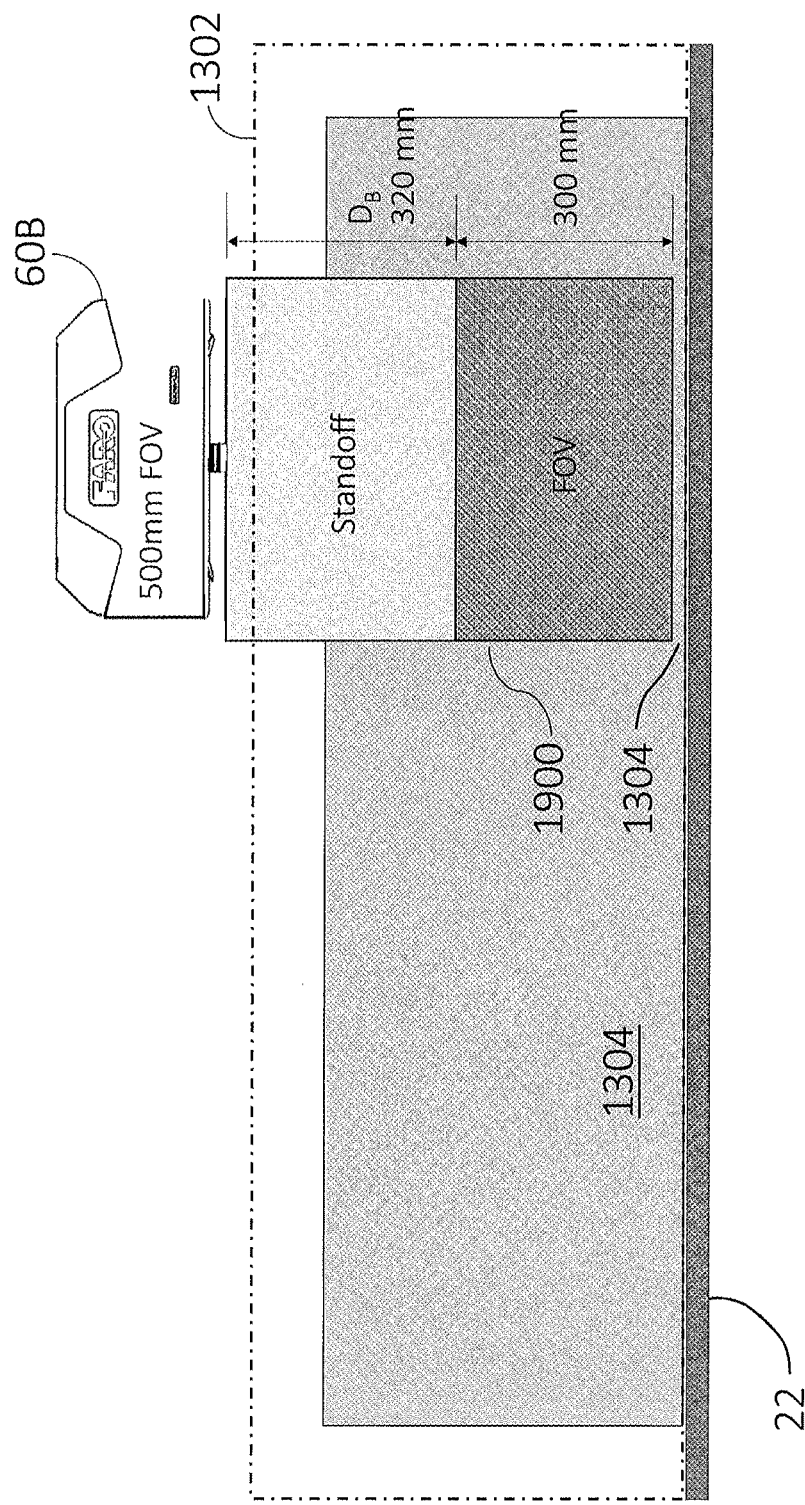

FIGS. 17-19 show two versions 60A, 60B of the 3D imager 10. The 3D imager 60B includes relatively wide FOV projector and camera lenses, while the 3D imager 60A includes relatively narrow FOV projector and camera lenses. The FOVs of the wide-FOV cameras 606, 608 and projector 604 (FIG. 6) of FIGS. 19-20 are cameras 606B, 60B and projector 604B, respectively. The FOVs of the narrow-FOV cameras 606, 608 and projector 604 of FIGS. 17-18 are cameras 606A, 608A and projector 604A, respectively. As used herein, the standoff distance D of the 3D imager 60B is the distance from the front of the projector lens 604B to the point of intersection of the optical axes of the camera lens assemblies 606B, 608B, respectively, with the optical axis of the projector 604B. The standoff distance $D_A$ of the 3D imager 60A is defined in the same way. In the illustrated embodiment, the standoff distances $D_A$, $D_B$ for the 3D imagers 660A, 60B are different. In other embodiments, the standoff distance $D_A$ of the 3D imager 60A is the same as the standoff distance $D_B$ of the 3D imager 60B.

In an embodiment, the narrow-FOV camera lenses of 3D imager 60A may have longer focal lengths than the wide-FOV camera lenses of 3D imager 60B if the photosensitive array is the same size in each case. In addition, as shown in FIGS. 19-20, the width of the measurement region 1700 is smaller than the width of the measurement region 1900. In addition, if the diameters of lens apertures are the same in each case, the depth (the depth of field (DOF)) of the measurement region 1700 is smaller than the depth (DOF) of the measurement region 1900. In an embodiment, 3D imagers 60 are available with different fields of view and different image sensor resolution and size.

It should be appreciated that it is undesirable for the 3D imager 60A, 60B or any portion thereof from entering the first zone 1302 about the workpiece 1304. As a result, the minimum thickness of a portion of the workpiece 1304 may be different due to the difference in the size of the measurement regions 1700, 1900. In some embodiments, depending on the size of the workpiece, the first zone standoff distance a, the standoff distance D, and the measurement region size 1700, 1900, there may be a minimum thickness of the workpiece 1304 that the 3D imager 60A, 60B can measure. For example, in the embodiment of FIGS. 17-18, for a workpiece having a maximum height of 50 cm, a first zone standoff distance of 100 mm, a 3D imager standoff distance $D_A$ of 90 mm. Due to the smaller size of the measurement region 1700, the minimum thickness of the workpiece that may be measured is 5 mm.

In an embodiment, the system 20 performs an initial scan of the workpiece 1304 to identify the bounds of the workpiece 1304. Based on this initial scan, the system 20 determines whether the 3D scanner 60 is capable of measuring to the platform 22. In an embodiment, the system 20 transmits a signal to the operator to alert to notify them that the system 20 may not be able to measure at least some aspects of the workpiece 1304.

Figure 21:
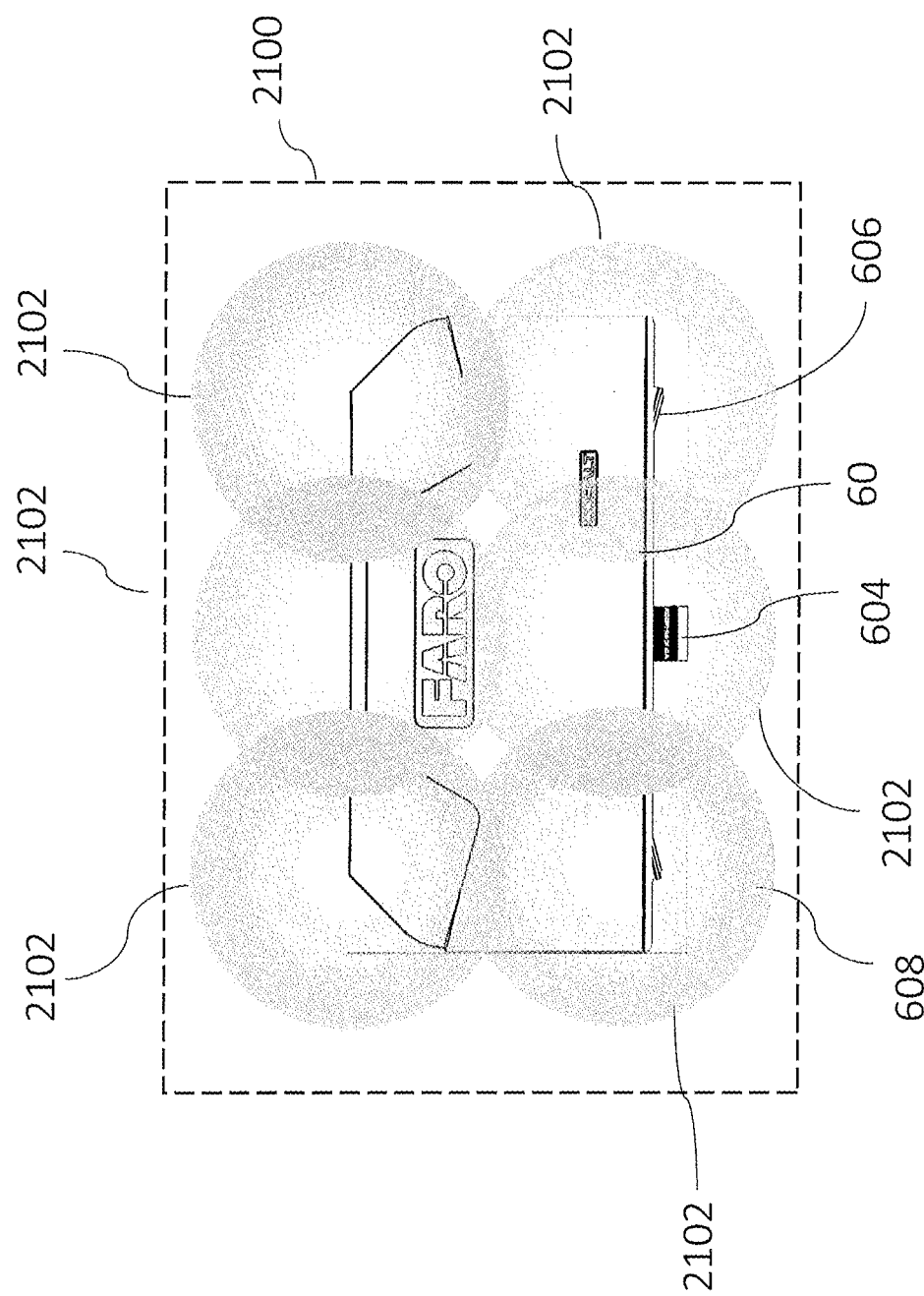
FIG. 21 is a schematic illustration of a 3D imager with spherical zones.

In an embodiment, shown in FIG. 21, the system 20 creates an additional zone 2100 about the 3D imager 60 to avoid a collision between the 3D imager 60 and the workpiece 1304. In an embodiment, the system 20 generates six spherical zones 2102 around the 3D imager 60. The spherical zones 2102 generate an area around the 3D imager 60 where objects (such as workpiece 1304) should not enter. In other words, the system 20 assumes the 3D imager is larger in size than the actual 3D imager 60. In one embodiment, the spherical zones 2102 are placed around or centered on the cameras 606, 608, projector 604, the rear corners and the rear-center of the 3D imager 60.

Figure 22:
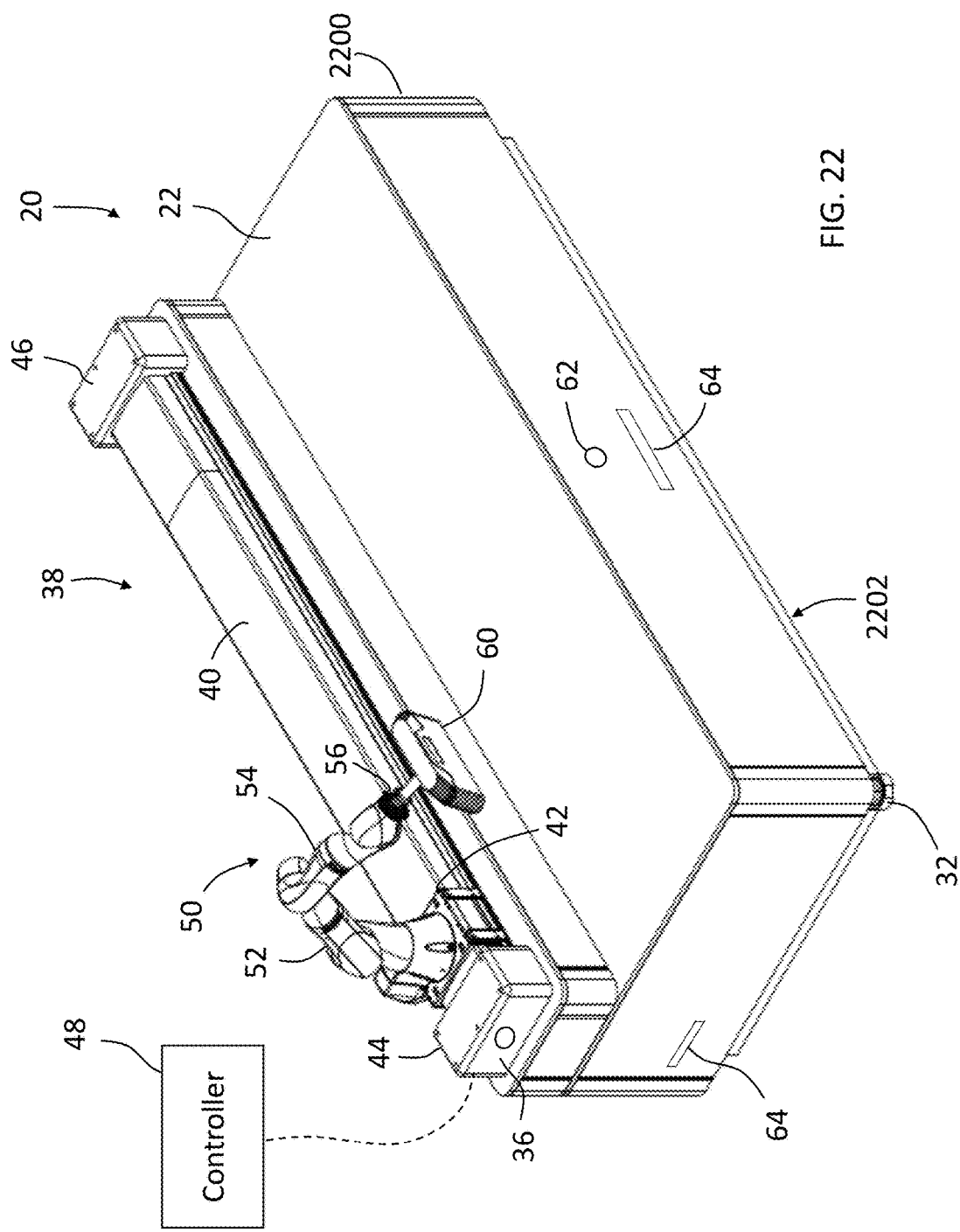
FIG. 22 and FIG. 23 are perspective views of a measurement system according to another embodiment.
Figure 23:
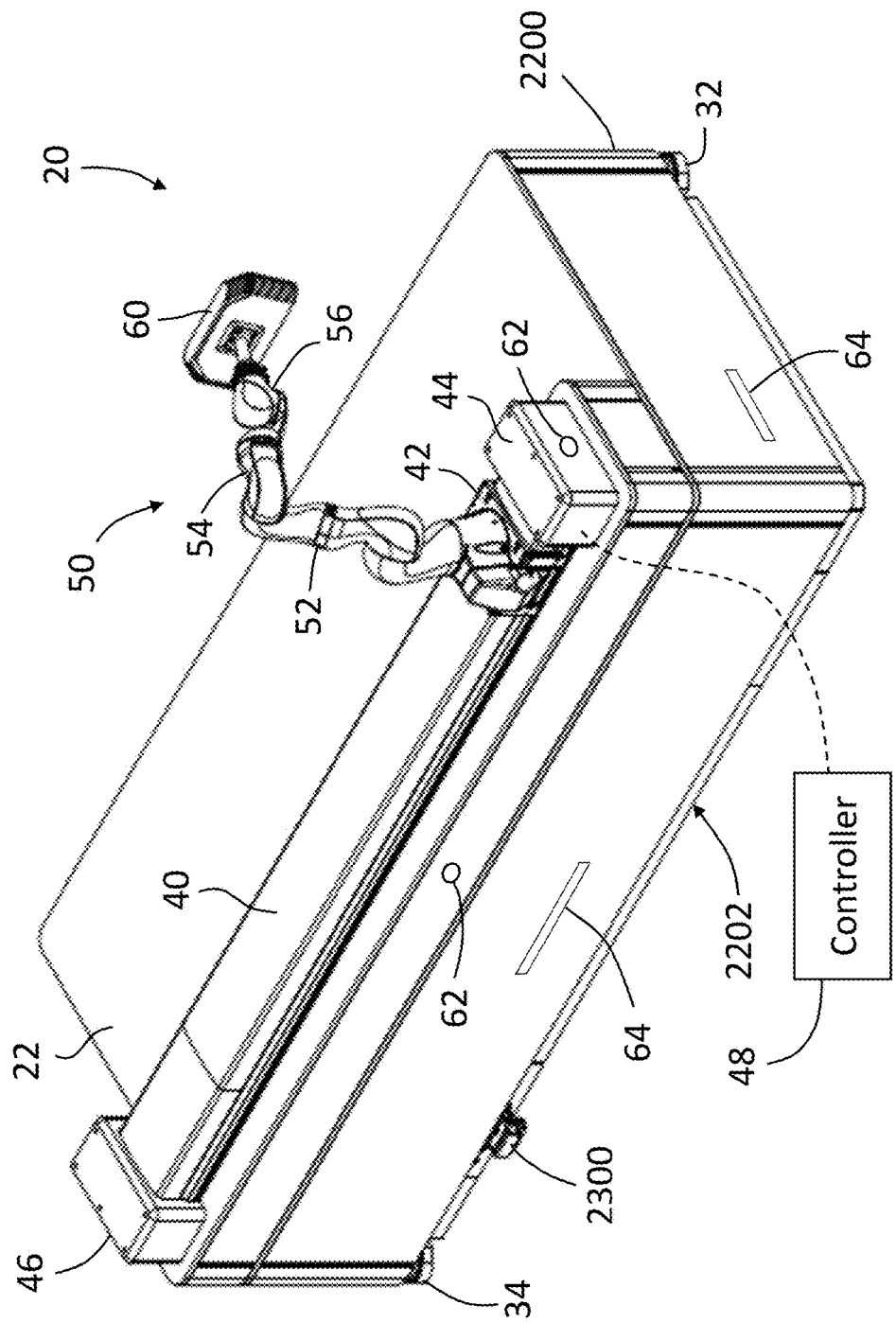

Referring now to FIG. 22 and FIG. 23, another embodiment of the measurement system 20 is shown. This embodiment is similar to that shown in FIGS. 1-5, except that the platform 22 is elevated off the floor by a frame member 2200. In this embodiment, the frame 2200 includes a slot 2202 that is position adjacent the floor that the system 20 rests. Similar to slot 30 (FIG. 1), the optical sensors 32, 34 are disposed in at least two corners of the slot 2202. In an embodiment, the optical sensors are disposed at opposing corners. The optical sensors 32, 34 define a plane (e.g. plane 1200, 202—FIG. 12) that is generally parallel to, and adjacent with, the floor.

In an embodiment, the system 20 further includes a connector member 2300. The connector member 2300 provides a connection point for electrical power and data to the system 20. In an embodiment, the connector member 2300 is disposed within the slot 2202 and placed to avoid having cables interfere with the travel or operation of the robotic arm 50.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A measurement system, comprising:
a measurement platform having a planar surface;
at least two optical sensors coupled to the measurement platform, the optical sensors each having a light source, an optical sensor, and a processor that causes light from the light source to be emitted in a plane and determines a distance to an object based on a reflection of the light, the at least two optical sensors being arranged to detect a human operator in a 360 degree area about the measurement platform;
a linear rail coupled to the measurement platform;
a cooperative robot coupled to move along the linear rail;
a three-dimensional (3D) measuring system coupled to the end of the cooperative robot, the 3D measuring system comprising:
an imager device having a projector, a first camera and a second camera arranged in a predetermined geometric relationship, the first camera and second camera each having a photosensitive array, the projector projecting a pattern of light that includes at least one element;
one or more first processors operably coupled to the display, the projector, the first camera and the second camera, wherein the one or more first processors are responsive to executable computer instructions for determining a distance to the at least one element; and
a controller operably coupled to the at least two optical sensors, the cooperative robot, and the 3D measuring system, the controller having one or more second processors that are responsive to executable instructions for changing the speed of the robot and the 3D measuring system to be less than a threshold in response to a distance measured by at least one of the at least two optical sensors to a human operator being less than a first distance threshold.

2. The system of claim 1, wherein the first distance threshold is based at least in part on a speed of the cooperative robot and the 3D measuring system.

3. The system of claim 2, wherein the one or more second processors are further responsive for reducing the speed of the robot and 3D measuring system to be less than a speed threshold in response to the distance measured being less than a second threshold.

4. The system of claim 3, wherein the speed threshold is equal to or less than 255 mm/second.

5. The system of claim 3, wherein the first threshold defines a first radius about the measurement platform and the second threshold defines a second radius about the measurement platform, the second radius being less than the first radius.

6. The system of claim 5, wherein the first radius and second radius are centered on the measurement platform.

7. The system of claim 5, wherein the center of the first radius and the second radius moves based on a position of the 3D measurement device.

8. The system of claim 5, wherein the center of the first radius and the second radius moves based on a position of the cooperative robot.

9. The system of claim 1, wherein the at least two optical sensors include a first optical sensor coupled to a first corner of the measurement platform and a second optical sensor coupled to a second corner of the measurement platform, the first corner being diagonally opposite the first corner.

10. The system of claim 1, further comprising:
at least one light coupled to an end of the measurement platform and operably coupled to the controller, the at least one light operable to change between a first color, a second color and a third color; and
wherein the controller is responsive to change the color of the at least one light based at least in part on an operational state of the cooperative robot.

11. The system of claim 1, wherein the operational state of the cooperative robot includes a robot stopped state, a robot waiting state, and an operating state.

12. A method of measuring an object, the method comprising:
placing an object on a measurement platform;
moving a cooperative robot at a first speed along a rail coupled to the measurement platform;
scanning the object with a three-dimensional (3D) measuring system coupled to an end of the cooperative robot, the 3D measuring system including an imager device having a projector, a first camera and a second camera arranged in a predetermined geometric relationship, the first camera and second camera each having a photosensitive array, the projector projecting a pattern of light that includes at least one element;
scanning a plane about the measurement platform with at least one optical sensor;
detecting, with the at least one optical sensor, a human operator at a first distance; and
changing the movement of the robot to a second speed when the first distance is less than a first distance threshold, the second speed being less than the first speed.

13. The method of claim 12, further comprising determining the first distance threshold based at least in part on the first speed.

14. The method of claim 13, further comprising:
detecting, with the at least one optical sensor, that the human operator is at a second distance;
determining a second threshold based at least in part on the second speed; and
changing the movement to a third speed when the second distance is less than the second distance threshold, the third speed being less than the second speed.

15. The method of claim 14, wherein the third speed is less than or equal to 255 mm/second.

16. The method of claim 14, further comprising:
determining a first radius based on the first threshold;
determining a second radius based on the second threshold; and
wherein the second radius is less than the first radius.

17. The method of claim 16, further comprising moving a center of the first radius and a center of the second radius based at least in part on a position of the 3D measuring system.

18. The method of claim 16, further comprising moving a center of the first radius and a center of the second radius based at least in part on a position of the cooperative robot.

19. The method of claim 12, wherein the at least one optical sensor includes a first optical sensor coupled to a first corner of the measurement platform and a second optical sensor coupled to a second corner of the measurement platform, the second corner being diagonally opposite the first corner.

20. The method of claim 12, further comprising changing a color of an light coupled to an end of the measurement platform based at least in part on an operating state of the cooperative robot.

\* \* \* \* \*